United States Patent
Sato et al.

(10) Patent No.: US 7,298,399 B2
(45) Date of Patent: Nov. 20, 2007

(54) APPARATUS AND METHOD FOR CONTROLLING A CAMERA CONNECTED TO A NETWORK

(75) Inventors: Mamoru Sato, Tokyo (JP); Tadashi Yamakawa, Yokohama (JP); Yoshiyuki Akiba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 10/260,289

(22) Filed: Oct. 1, 2002

(65) Prior Publication Data

US 2003/0025801 A1 Feb. 6, 2003

Related U.S. Application Data

(62) Division of application No. 08/898,197, filed on Jul. 22, 1997, now Pat. No. 6,525,761.

(30) Foreign Application Priority Data

Jul. 23, 1996 (JP) .................................. 8-193729
Nov. 29, 1996 (JP) .................................. 8-320558

(51) Int. Cl.
*H04N 5/232* (2006.01)
(52) U.S. Cl. ................. 348/211.3; 348/211.1; 348/211.6
(58) Field of Classification Search ............. 348/211.1, 348/211.12, 211.2, 211.3, 211.5, 211.6, 211.8, 348/231.2, 14.02, 14.08; 725/105, 109
See application file for complete search history.

(56) References Cited

U.S. PATENT DOCUMENTS

| | | |
|---|---|---|
| 4,769,811 A | 9/1988 | Eckberg, Jr. et al. |
| 5,063,440 A | 11/1991 | Hong |
| 5,115,429 A | 5/1992 | Hiuchyj et al. |
| 5,193,151 A | 3/1993 | Jain |

(Continued)

FOREIGN PATENT DOCUMENTS

EP 0715453 A2 6/1996

(Continued)

OTHER PUBLICATIONS

Gunji Kakogawa, "Graphic Techniques of Internet", Nikkei Computer Graphics, Japan, Nikkei BP Corp, Oct. 8, 1996, No. 121, pp. 136-143, and Partial English Translation of p. 143.

(Continued)

*Primary Examiner*—Lin Ye
*Assistant Examiner*—Kelly Jerabek
(74) *Attorney, Agent, or Firm*—Morgan & Finnegan LLP

(57) ABSTRACT

A camera control apparatus provides an end user with environment to easily remote-control a video camera via a general network such as the Internet. When the camera control apparatus 1001 receives a file-transfer request described in the format of the network from an external device 1002 connected to the apparatus, it handles a characters in a character string of a file name of the request as camera-control characters. As a result, if the character string includes description corresponding to the format for camera control, the camera control apparatus 1001 controls the camera in accordance with the description to perform image sensing, and transfers the obtained video image as the content of an image file requested by the external device as the file-transfer request originator.

2 Claims, 20 Drawing Sheets

U.S. PATENT DOCUMENTS

| | | | |
|---|---|---|---|
| 5,375,068 A | 12/1994 | Palmer et al. | |
| 5,379,297 A | 1/1995 | Glover et al. | |
| 5,444,476 A * | 8/1995 | Conway | 348/14.1 |
| 5,444,482 A | 8/1995 | Misawa et al. | |
| 5,459,520 A | 10/1995 | Sasaki | |
| 5,517,652 A | 5/1996 | Miyamoto et al. | |
| 5,579,301 A | 11/1996 | Ganson et al. | |
| 5,589,878 A * | 12/1996 | Cortjens et al. | 348/211.12 |
| 5,592,302 A | 1/1997 | Hirabayashi | |
| 5,640,202 A | 6/1997 | Kondo et al. | |
| 5,657,246 A | 8/1997 | Hogan et al. | |
| 5,674,003 A | 10/1997 | Andersen et al. | 364/514 R |
| 5,706,434 A | 1/1998 | Kremen et al. | 395/200.09 |
| 5,729,471 A | 3/1998 | Jain et al. | |
| 5,742,329 A | 4/1998 | Masunaga et al. | |
| 5,742,762 A | 4/1998 | Scholl et al. | 395/200.3 |
| 5,758,085 A | 5/1998 | Kouoheris et al. | 395/200.61 |
| 5,758,094 A * | 5/1998 | Goettsch | 709/204 |
| 5,778,187 A | 7/1998 | Monteiro et al. | |
| 5,790,792 A | 8/1998 | Dudgeon et al. | 395/200.42 |
| 5,809,161 A * | 9/1998 | Auty et al. | 382/104 |
| 5,822,537 A | 10/1998 | Katseff et al. | |
| 5,839,905 A | 11/1998 | Redford et al. | |
| 5,848,415 A | 12/1998 | Guck | |
| 5,859,979 A | 1/1999 | Tung et al. | |
| 5,870,093 A | 2/1999 | Martin et al. | |
| 5,878,219 A | 3/1999 | Vance, Jr. et al. | |
| 5,926,209 A * | 7/1999 | Glatt | 348/143 |
| 5,956,482 A | 9/1999 | Agraharam et al. | |
| 5,982,362 A | 11/1999 | Crater et al. | |
| 6,067,571 A * | 5/2000 | Igarashi et al. | 709/232 |
| 6,122,005 A | 9/2000 | Sasaki et al. | |
| 6,209,048 B1 | 3/2001 | Wolff | 710/62 |
| 6,313,875 B1 * | 11/2001 | Suga et al. | 348/211.99 |
| 6,459,451 B2 * | 10/2002 | Driscoll et al. | 348/335 |
| 6,469,737 B1 * | 10/2002 | Igarashi et al. | 348/211.3 |
| 6,525,761 B2 * | 2/2003 | Sato et al. | 348/14.04 |
| 6,680,746 B2 * | 1/2004 | Kawai et al. | 348/211.9 |
| 6,930,709 B1 * | 8/2005 | Creamer et al. | 348/211.3 |
| 7,219,365 B2 * | 5/2007 | Sato et al. | 725/105 |
| 2002/0171741 A1 * | 11/2002 | Tonkin et al. | 348/211.3 |

FOREIGN PATENT DOCUMENTS

| | | |
|---|---|---|
| JP | 63-164782 A | 7/1988 |
| JP | 2-209043 A | 8/1990 |
| JP | 04320183 A | 11/1992 |
| JP | 5-47067 | 2/1993 |
| JP | 5-268296 A | 10/1993 |
| JP | 6-121309 | 4/1994 |
| JP | 6-205122 | 7/1994 |
| JP | 6-233298 | 8/1994 |
| JP | 7-075092 A | 3/1995 |
| JP | 7-095200 A | 4/1995 |
| JP | 7-123167 | 5/1995 |
| JP | 07121789 A | 5/1995 |
| JP | 7-152668 A | 6/1995 |
| JP | 7-203053 A | 8/1995 |
| JP | 07250322 A | 9/1995 |
| JP | 7-321944 | 12/1995 |
| JP | 7-321994 | 12/1995 |
| JP | 8-44643 | 2/1996 |
| JP | 9-325925 | 12/1997 |
| JP | 10-42279 | 2/1998 |
| JP | 10-51674 | 2/1998 |
| WO | WO 95/11566 | 4/1995 |
| WO | WO 96/02106 | 1/1996 |

OTHER PUBLICATIONS

Masaki Kamiura et al., "Incremental Organization and Multiple Views for Hypermedia Databases", IPSJ SIG Notes, Japan, Information Processing Society of Japan, Jul. 20, 1995, vol. 95, No. 65, pp. 225-232 (which includes English Abstract).

Mike Blaszczak, "Programming Techniques" Microsoft System Journal in Japan, Japan, ASCII Corp, Aug. 18, 1996, No. 44, pp. 103-119.

Gakuya Takada, "Communication Q & A: What is Cookies used in WWW?", Nikkei BP Communications, Japan, Nikkei BP Corp, Nov. 4, 1996, No. 233, pp. 138-139.

Japanese Office Action with partial English Translation dated Mar. 28, 2005.

Japanese Office Action dated Mar. 22, 2002.

English Abstract of JP 07250322 A.

English Abstract of JP 07121789 A.

English Abstract of JP 04320183 A.

Goldberg et al. "Desktop Teleoperation via the World Wide Web" IEEE International Conference on Robotics & Automation, May 21, 1995, pp. 654-659.

Himonas et al., "A Multiple Access Control Protocol for an Interactive Multimedia Network", IEEE, May 1996, pp. 262-266.

Robinson et al., "A MIB For Video Server System Management", IEEE, 1995, pp. 109-115.

Little et al., "Client-Server Metadata Management for the Delivery of Movies in a Video-On-Demand System", IEEE, May 1994, pp. 11-18.

U.S. Appl. No. 09/503,090, filed Feb. 10, 2000, Igarashi et al.

U.S. Appl. No. 08/898,268, filed Jul. 22, 1997, Igarashi et al.

Japanese Office Action dated Mar. 22, 2002 with English Translation.

Japanese Office Action dated Jan. 7, 2005 with English Translation.

Japanese Office Action dated Jan. 7, 2005.

Goldberg et al., "Beyond the Web: Excavating the Real World Via Mosaic".

Second International WWW Conference, Chicago, III, pp. 1-15; Oct. 17, 1994.

* cited by examiner

FIG.3

| IMAGE-SENSING TIME | ACCEPTANCE CODE | IMAGE-SENSING CONDITION | IMAGE FORMAT |
|---|---|---|---|
| 1996.7.6.13.15 | 12543 | P25T0Z3 | gif |

FIG.4

| ACCEPTANCE CODE | IMAGE FORMAT | IMAGE DATA |
|---|---|---|
| 12543 | gif | 0100011101001001....... |

FIG.6

| IMAGE-SENSING TIME | END TIME | INTERVAL TIME | ACCEPTANCE CODE | IMAGE-SENSING CONDITION | IMAGE FORMAT |
|---|---|---|---|---|---|
| 1996.7.6.13.15 | 1996.7.6.13.45 | 15 | 12543 | P25T0Z3 | gif |

FIG.13

| IMAGE-SENSING TIME | ACCEPTANCE CODE | IMAGE-SENSING CONDITION | IMAGE FORMAT |
|---|---|---|---|
| 1996.7.6.13.15 | 817b7abda93043a1a15d4546ca779bc16 | P25T0Z3 | gif |

FIG.14

| ACCEPTANCE CODE | IMAGE FORMAT | IMAGE DATA |
|---|---|---|
| 817b7abda93043a1a15d4546ca779bc16 | gif | 01000111010010011....... |

FIG.19

| ACCEPTANCE CODE | IMAGE FORMAT | IMAGE DATA |
|---|---|---|
| 12543 | gif | 0100011101001001...... |
| 12543 | gif | 0010010011100...... |
| 12543 | gif | 00110...... |
| | | |

FIG.20

| IMAGE-SENSING TIME | ACCEPTANCE CODE | | IMAGE-SENSING CONDITION | IMAGE FORMAT |
|---|---|---|---|---|
| 1996. 7. 6. 13.15 | 12543 | 1 | P25T0Z3 | gif |
| 1996. 7. 6. 13.15 | 12543 | 2 | P30T0Z3 | gif |
| 1996. 7. 6. 13.15 | 12543 | 3 | P35T0Z3 | gif |
| | | | | |

APPARATUS AND METHOD FOR CONTROLLING A CAMERA CONNECTED TO A NETWORK

This is a Divisional Application under 37 C.F.R. 1.53(b) U.S. patent application Ser. No. 08/898,197, filed on Jul. 22, 1997, now U.S. Pat. No. 6,525,761 hereby incorporated by reference.

BACKGROUND OF THE INVENTION

This invention relates to a camera control apparatus and method and, more particularly to a camera control apparatus and method for remote-controlling a camera via a network.

A camera control system for controlling a camera (e.g., panning, tilting and zooming of the camera) from a remote place is widely known.

In this system, even though camera control is performed via a network, a device for camera control and a client device do not depend on common specification but on unique specifications (e.g., protocol and control information).

However, in recent years, the Internet has been becoming popular with rapidity, and there is an increasing need from end users to see video images sensed by a camera at a remote place via the Internet.

One means to meet this requirement is to periodically store a video image sensed by a camera, in a file, into a storage device of a server connected to the camera, and transfer the file to a terminal (client) that has accessed the server. On the end-user side, a browser, for example, is activated so as to display the video image.

However, this merely displays the video image as sensed, but cannot meet requirements to see, e.g., the image in a view a little shifted to either side, the image in a wider view, or the image expanded within the view.

The conventional camera remote-control technique is based on particular specification, which cannot be applied to use on the Internet.

SUMMARY OF THE INVENTION

The present invention has been made in consideration of the above situation, and has its object to provide a camera control apparatus and method which provides an end user with environment to easily remote-control a video camera via a general network such as the Internet.

According to the present invention, the foregoing object is attained by providing a camera control apparatus, connected to a general network, capable of controlling image-sensing condition of a camera, comprising: reception means for receiving a character string descried in a format of file-transfer request used on the network; discrimination means for discriminating a predetermined control character relating to camera control, and a character indicating a control amount accompanying the control character, from a character string at a particular position of the character string received by the reception means; and control means for controlling the camera based on the result of discrimination by the discrimination means, and transferring video image data obtained by the camera to a file-transfer request originator.

Another object of the present invention is to provide a camera control apparatus and method, used in a system where camera image-sensing condition and the like can be remote-controlled in a predetermined network, capable of notifying overlap in reservation of image-sensing programming if occurred.

Another object of the present invention is to provide a camera control apparatus and method which unnecessitates inputting an acceptance code for displaying a video image obtained by programmed image sensing and dynamically generating an HTML document by a CGI program, and which enables to easily display a desired video image obtained by programmed image sensing.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a table showing an example of a data format in a reservation register according to the first embodiment;

FIG. 4 is a table showing an example of a management format for data stored in an image memory according to the first embodiment;

FIG. 6 is a table showing an example of a data format in a reservation register according to a third embodiment of the present invention;

FIG. 13 is a table showing an example of a data format in the reservation register according to the seventh embodiment;

FIG. 14 is a table showing an example of a management format for data stored in the image memory according to the seventh embodiment;

FIG. 19 is a table showing an example of a data storage format in a reservation register according to the third embodiment of the present invention; and FIG. 20 is a table showing an example of a data storage format in a reservation table according to the fifth embodiment.

DETAILED DESCRIPTION OF THE PREFERRED EMBODIMENTS

Preferred embodiments of the present invention will now be described in detail in accordance with the accompanying drawings.

First Embodiment

Figure 1:
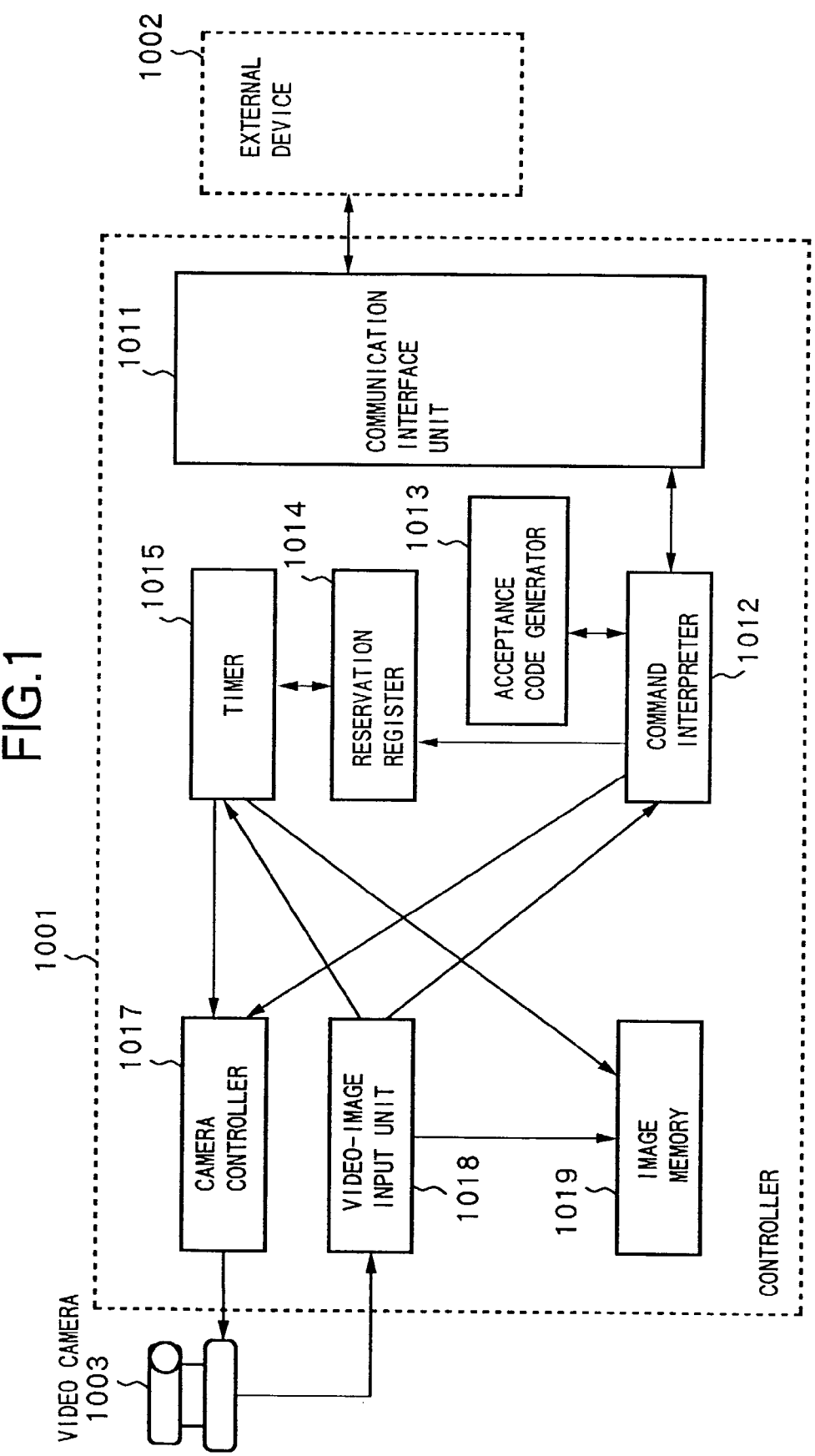
FIG. 1 is a block diagram showing a camera control apparatus according to a first embodiment of the present invention.

FIG. 1 is a block diagram showing the construction of a camera control apparatus according to a first embodiment of the present invention. In FIG. 1, reference numeral 1001 denotes a camera control apparatus, basically comprising a personal computer, for example. Numeral 1003 denotes a video camera (hereinafter simply referred to as "camera") as the object of the control by the camera control apparatus 1001. The content of control includes control of image-sensing condition such as panning, tilting, exposure and the like as well as zooming. For the control, the camera 1003 has a panhead (not shown). The camera 1003 and the camera control apparatus 1001 are connected to each other via, e.g., an RS232C interface generally used in a personal computer. Note that the video information obtained by the camera 1003 is outputted to the camera control apparatus 1001 via a dedicated cable which is specially provided.

The camera control apparatus 1001 has the following construction.

Numeral 1017 denotes a camera controller which outputs various control signals via the above interface; 1018, a video-image input unit which inputs a video image sensed by the camera 1003 by using an image capture device or the like; 1011, a communication interface unit for the camera control apparatus 1001 to exchange information with another apparatus by using a network adapter or the like. Besides these resources, the camera control apparatus 1001 comprises a command interpreter 1012, which is realized as a program or memory data utilizing the various resources such as a CPU, a storage device and an auxiliary storage device of a computer, an acceptance code generator 1013, a timer 1015, an image memory 1019, and a reservation register 1014.

Numeral 1002 denotes an external device such as a WWW (World Wide Web) server or a WWW browser for communication by the HTTP (Hyper-Text Transfer Protocol) protocol. That is, a WWW browser sends a request in accordance with a URL (Uniform Resource Locator) indicating the storage destination of desired data to a WWW server, which is a storage of document data and image data. In response to the request, the WWW server returns corresponding document data or image data to the WWW browser.

In the present embodiment, the communication interface unit 1011 uses a method realized by the WWW servers. That is, communication is performed by the HTTP protocol, and the camera control apparatus 1001 behaves as if it is a WWW server. This is possible by applying the WWW server's communication method to the present control apparatus.

Generally, when image data is pasted in a WWW document, the request command is described as follows:
<img src="http://www.foo.co.jp/image001.gif">

(A character string in quotation marks "" is described as single string without any line-feed/new paragraph mark.)

This means that it is requested to transfer image data stored in a file "image001.gif" in a WWW server "www-.foo.co.jp". The browser displays the image transferred from the WWW server on its display window image.

The present embodiment performs remote camera control while utilizing the above specification.

That is, in the present embodiment, a character string corresponding to the above file name is interpreted as a command. Specifically, camera-angle destination such as panning, tilting and zooming are represented by alphabets "P", "T" and "Z" respectively, then, respective control amounts are represented by numerical values.

Assuming that the camera 1003 has a pan angle from $-50°$ to $50°$, a tilt angle from $-20°$ to $20°$ and 1 to 8 times zooming, when image sensing is performed with a pan angle of $20°$, a tile angle of $5°$ and twice zooming, and the obtained image is pasted as "gif" format image data, the description is as follows (note that the network address of the present camera control apparatus is www.foo.co.jp):
<img src="http://www.foo.co.jp/P20T5Z2.gif">

The external device 1002, which is a WWW server for the WWW browsers, outputs the above character string in HTML (Hyper-Text Markup Language) description to the camera control apparatus 1001, requiring the image data.

When this request enters the camera control apparatus 1001 via the communication interface unit 1011, the command interpreter 1012 is activated to start interpretation of the request (the above HTML character string) and processing of a response to the request.

Figure 2:
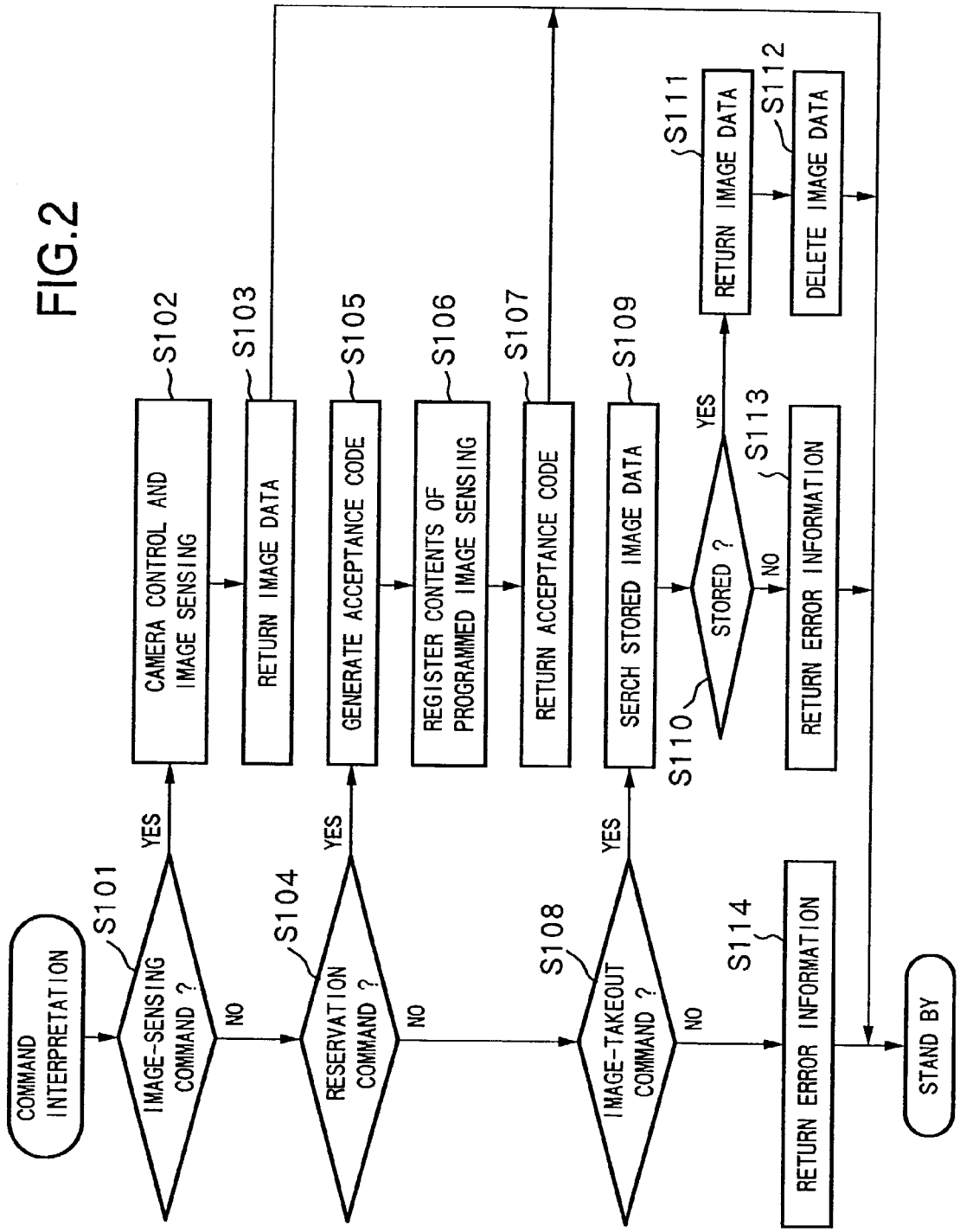
FIG. 2 is a flowchart showing a process procedure of a command interpreter according to the first embodiment.

FIG. 2 is a flowchart showing an example of the processing.

First, at step S101, the command described as a file name is interpreted. That is, if the head of the request is "P", the command is recognized as an image-sensing command, then process proceeds to step S102.

At this step, the camera 1003 is controlled by the camera controller 1017 based on the designated pan, tilt and zoom values. The obtained image is captured by the video-image input unit 1018, and converted into data of the designated image format, then sent to the external device 1002 requiring the image data, via the communication interface unit 1011. The external device 1002 stores the image data, and transfers the image data to the initial request originator.

At this time, as the communication interface unit 1011 uses the HTTP protocol, content-type information and status information corresponding to the image format are added to the head of the image data. Then, the process ends.

Thus, the obtained video image is displayed in the HTML document as if it is image data stored in a file in the WWW server.

In the command interpretation at step S101, if the head of the request is "R", the command is recognized as a reservation command designating image-sensing time. Then, the process proceeds to step S105 via the determination of image-sensing condition at step S104.

The reservation command starts with "R"; then it continues with integers indicating year, month, day, hour, and minute, each terminated with a period, and with designation of panning, tilting and zooming as image-sensing condition; finally it ends with a name (an extension) indicating the image format. Note that if it has no image-sensing condition, the camera angle at the designated image-sensing time is employed.

For example, if video-image sensing is programmed with image-sensing time of 13:15 on Jul. 6, 1997, a pan angle of 25°, a tilt angle of 0° and a 3 times zooming, in gif format, the reservation is described as follows:

<img src="http://www.foo.co.jp/R1996.7.6.13.15.P25T0Z3.gif">

When the above reservation command is designated, a unique identification number is received as an acceptance code (code indicating that reservation is accepted) from the acceptance code generator 103 at step S105. The acceptance code may be a count value which is incremented by one (+1) at each request generated, or may be a numerical value indicating the designated time (year, month, date and time).

Then, at step S106, the acceptance code and information on the designated time, the image-sensing condition and the image format are registered into a storage device (not shown) of the reservation register 1014. At step S107, the acceptance code is returned via the communication interface unit 1011 to the external device 1002 which issued the reservation command, further, toward the end user.

Note that at this time, to indicate that the response is an acceptance code, content-type information and status information are added to the head of the code. Then the process ends.

However, if an HTML document including such image-sensing reservation is simply generated but a general WWW browser is used to display the obtained image, the acceptance code instead of image data is returned and an image is not displayed.

However, if image-sensing is reserved with respect to the camera control apparatus 1001 by using a CGI program or the like of the WWW server, in the same manner as that in the WWW browser, and after an acceptance code has been obtained, an HTML document is generated with image-data description designating the acceptance code by an image read command to be described later, image sensing can be performed as programmed when the document is displayed by the WWW browser, and the image data can be displayed.

That is, when the designated time registered in the reservation register 1014 has come, the camera control apparatus 1001 controls the camera 1003 at the registered camera angle to perform the programmed image sensing, and stores the obtained image data in the designated format with an appropriate name, e.g., an acceptance code, as a file name, into the image memory 1019. Thereafter, when an image read command (including an acceptance code) is sent from the external device 1002, image data corresponding to the read command is read from the image memory 1019, and transferred in the designated format to the external device 1002, and the terminal of the end user (WWW browser).

Note that the image read command starts with alphabet "G", then continues with the acceptance code, and ends with the extension indicating the image format.

The acceptance code is returned to the external device 1002 upon reservation. For example, if "12543" is returned as an acceptance code, to read the image obtained by programmed image sensing, the following description is used:

<img src="http://www.foo.co.jp/G12543.gif">

Various information is stored into the storage device of the reservation register 1014 in the format of a table, e.g. as shown in FIG. 3. Note that in the present embodiment, the reservation register 1014 uses its own storage device, however, the reservation register 1014 may use the image memory 1019 of the camera control apparatus 1001 or any other storage device.

Note that the character string ("gif" in this case) meaning image formation, added to the end of the image read command must be basically the same as that of the reservation command. If different character string is used in the read command, however, it may be arranged such that the camera control apparatus 1001 converts the image stored in the image memory 1019 with the reservation code into a newly designated format data and transfers the converted data.

Returning to FIG. 3, in the above reservation, the acceptance code is "12543". That is, in FIG. 3, the reservation data indicates, first, image-sensing time, the acceptance code, image-sensing condition, and an image format.

The image memory 1019 is managed in the format as shown in FIG. 4, where an acceptance code (issued in correspondence with a reservation command, having a meaning equivalent to a file name), an image format, and actual image data are stored. Note that the image memory 1019 may be a storage device of any format, preferably having a sufficient capacity; for example, the image memory 1019 may be a hard disk device, a magneto-optical disk device and the like.

Next, the process procedure of the camera control apparatus of the present embodiment when it has received an image read command will be described.

In the command interpretation at step S101, if the head of the command is "G", the process proceeds to step S104, at which it is determined whether or not the command is a reservation command. Since the command is not a reservation command (NO at step S104) in this case, the process proceeds to step S108. As it is determined at step S108 that the command is an image read command, the process proceeds to step S109, at which corresponding data stored in the image memory 1019 is searched based on the acceptance code included in the image read command.

Then, at step S110, it is determined whether or not the data obtained by the above search has the same value of the acceptance code described as the image read command. If YES, the image data is read, and transferred via the communication interface unit 1011 to the external device 1002 requesting the image data.

Also at this time, as the communication interface unit 1011 uses the HTTP protocol, content-type information and status information corresponding to the image format are added to the head of the image data (step S111).

At step S112, data in the storage area of the image memory 1019, from which the image data has been read out, is deleted. Then the process ends.

If it is determined at step S110 that image data corresponding to the designated acceptance code is not stored, as the programmed image sensing has not been performed and corresponding image has not been obtained otherwise the image data has been already transferred and deleted from the image memory, error information is returned via the communication interface unit 1011 to the external device 1002 requesting the image data. Then the process ends.

Further, if it determined at step S108 that the head of the command from the external device 1002 is not "G", error information indicating that the command is an undefined command is returned via the communication interface unit 1011 to the external device 1002 requesting the image. Then the process ends.

As described above, information exchange is performed between the external device 1002 and the camera control apparatus 1001 of the present embodiment.

Next, the timer 1015, used for performing camera control and storing the result of image-sensing, based on reservation data registered in the reservation register 1014, will be described.

In the timer 1015, at intervals of a predetermined period, e.g., one minute, a timer program is activated. This program is realized by utilizing a timer of a computer or the like.

The operation of the timer program will be described with reference to the flowchart of FIG. 5.

First, at step S201, the current time is read from a timer of the camera control apparatus 1001, and the process proceeds to step S202.

At step S202, reserved contents, i.e., items of programmed image sensing sequentially registered in a respective row of the table of the storage device are read from the reservation register 1014. When it is determined at step S203 that all the items of programmed image sensing have been read out, the process ends, otherwise, the process proceeds to step S204, at which it is determined whether or not the designated time in the reserved data is in the future. If it is determined that the current time is not the designated time yet, the processing at step S202 and the subsequent steps is repeated.

On the other hand, if it is determined at step S204 that the current time is the designated time or past the designated time, the process proceeds to step S205, at which the camera 1003 is controlled to perform image sensing, by the camera controller 1017, in accordance with the image-sensing condition of the items of the programmed image sensing read from the reservation register 1014. Then, the obtained image is converted into image data of the image format designated by a corresponding item of the programmed image sensing. At step S206, the image data is stored, with an acceptance code and image format information, into the image memory 1019. As a result, the image data in the format as shown in FIG. 4 is attached.

Next, at step S207, the read items of programmed image sensing are deleted from the reservation register 1014, and the process returns to step S202 to repeat the processing.

As described above, image sensing is performed as programmed, and the result of the image sensing is stored, thereafter, when an image read command is sent from the external device 1002, the image data is returned in response to the command.

As described above, a live image obtained by controlling a remote camera can be easily pasted in a WWW document by connecting the camera control apparatus of the present embodiment to a network of the www system, and describing a URL where description of image-sensing condition is added to the address of the camera control apparatus, as the source of the image data. Note that if only pasting the image data in a WWW document is performed, the acceptance code generator 1013, the timer 1015, the image memory 1019 and the reservation register 1014 are unnecessary, and step S104 and the subsequent steps of the processing by the command interpreter 1012 are unnecessary.

Further, by providing the timer 1015, the image memory 1019 and the reservation register 1014, programmed image sensing can be reserved, and later the result of image sensing can be taken into a WWW page and the image can be displayed in the WWW page, by utilizing a CGI program of a WWW server or the like. Especially, if image sensing is tried by controlling a remote camera when the network is overcrowded, image transfer takes much time and cannot smoothly provides image data. However, according to the present embodiment, image sensing in such time is programmed with specific camera angle for a necessary period, and the programmed image sensing is reserved, thereafter, stored image data can be read when the network becomes less crowded, e.g., at midnight.

Especially, image sensing can be performed plural times with the same camera angle at short intervals regardless of the transmission capacity of the network.

Note that the HTTP protocol is used as the interface between the camera control apparatus 1001 and the external device 1002, however, any other communication interface can be used.

Note that the acceptance code is used to identify sensed image data corresponding to the reservation of programmed image sensing, however, it may be arranged such that, instead of using the acceptance code generator, a unique request code is generated on the external device 1002 side (end user side) as a part of a reservation command, then the camera control apparatus 1001 identifies the image data by the correspondence between the request code and the external device 1002.

Further, it may be arranged such that upon notifying the above request code to the image-requesting side, a password is issued, and when the image data is read, the image data can be transferred to the image-requesting side by the reservation code with the password. This avoids at least the inconvenience that a third person sends an image transfer request with accidentally the same reservation code and the file is transferred to the third person then deleted.

Further, image-sensing time is designated in minute unit, however, it may be designated in second or millisecond unit.

In the present embodiment, to indicate the image format, the extension "gif" is employed. It may be arranged such that the image format indicated by the extension "gif" is arbitrarily changed for a JPEG format indicated by an extension "jpg".

Further, the file name is regarded as a command, however, a parameter description of a URL can be utilized.

For example, panning, tilting, zooming and image format are respectively set to "25°", "5°", "twice" and "gif", image sensing can be programmed by the following description:

<img src="http://www.foo.co.jp/cameraimage?P=20,T=5, Z=2,F=gif ">

Further, a WWW server may be installed into the camera control apparatus of the present embodiment. In this case, for example, a name "camctl.exe" is given to the program of the command interpreter 1012 as a CGI program for the WWW server, and the image sensing can be programmed by the following description:

<img src="http://www.foo.co.jp/cgibin/camctl.exe?P=20, T=5, Z=2, F=gif">

Furthermore, in the present embodiment, once the image data obtained by programmed image sensing has been transferred, the image data (file) is deleted, however, the image data is not necessarily deleted at this time.

That is, it may be arranged such that the image data, obtained by programmed image sensing and stored as a file, is held for an appropriate period, and when the period has elapsed, the image data is deleted even if the image data has not been transferred. This allows a plurality of end users to obtain the same image.

Further, it may be arranged such that a password is issued to an end user according to circumstances, and the image data is transferred only when the password coincides with that of the image data.

Second Embodiment

In the above first embodiment, programmed image sensing can be reserved for only one image.

Next, a second embodiment will be described a an example where a plurality of reservation commands are combined into a single file name, and a file extension indicating the image format is added to the file name, so as to reserve programmed image sensing with a plurality of image-sensing times and/or a plurality of camera angles.

For example, if image sensing is programmed with image-sensing times of 13:15, 13:30 and 13:45 on Jul. 6, 1997, a pan angle of 25°, a tilt angle of 0°, 3 times zoom ratio, with intention to read three images in "gif" format later, the reservation is described as follows:
<img src="http://www.foo.co.jp/R1996.7.6.13.15P25T0Z3+R1996.7. 6.13.30P25T0Z3+R1996.7.6.13.45P25T0Z3.gif">

Note that if the image sensing is performed plural times at the same time or on the same date or at the same camera angle, the corresponding information in the character string may be omitted. For example, the above reservation command may be described as follows:
<img src="http://www.foo.co.jp/R1996.7.6.13.15P25T0Z3+R....30+R....45.gif">

Note in the above description, each period means omission of the same numerical value as the initially set numerical value (in this case, year, month, day, hour and minute). This reduces the amount of information by omitting corresponding information such as date.

The basic construction of the second embodiment is substantially the same as that of the first embodiment except the following changes.

That is, in the process procedure of the command interpreter 1012, steps S106, S111 and S112 are executed in accordance with the command including the above description indicated by "+".

In accordance with the command interpretation, image data are stored in accordance with acceptance codes "12543-1", "12543-2" and "12543-3", as shown in FIG. 19, from the acceptance code in the reservation table as shown in FIG. 3. Note that the acceptance code transferred to the WWW browser is only "12543". Thereafter, when an image read command is received, image data having the common part of the acceptance codes ("12543" in this case) are found. The image data are re-formatted in the order of the numerals after the hyphen of the common part of the acceptance codes, into a single image data indicating a plurality of images, and the image data is returned via the communication interface unit 101 to the external device 1002 requesting the image data. The above reformat of plural image data as a single image data is realized by, e.g., combining image data sequentially.

At this time, as the communication interface unit 1011 uses the HTTP protocol, content-type information and status information corresponding to the image format are added to the head of the image data.

At step S112 according to the second embodiment, the data in the storage areas in the image memory 1019, from which the plurality of image data have been read, are deleted.

The above construction enables to program image sensing, at a plurality of camera angles or image-sensing times at one time, and handles a plurality of image data obtained by the plurality of programmed image sensing as a single image data file comprising a plurality of images, thus unnecessitates management of a plurality of acceptance codes corresponding to the respective images.

Further, if this technique is applied to interval image sensing such as a record of a plant's growth, an image file containing a series of images can be handled as a pseudo moving image.

Note that in this case, the plurality of image data are not combined, but sequentially transferred.

It goes without saying that applications of the present embodiment is similar to the first embodiment.

Third Embodiment

In the above second embodiment, in case of image sensing at fixed intervals, reservation commands must be combined corresponding to the number of image sensings.

Next, a third embodiment will be described as an example where, in the reservation command, immediately after the designated time end time and interval time are added, and then image-sensing condition such as a camera angle and the image format are designated, to reduce the amount of information to be set. In this embodiment, the end time is designated by numerical values following alphabet "t", and the interval time is designated by numerical values following alphabet "e" in minute unit.

For example, in a case where image sensing is programmed with image-sensing time of 13:15 and 13:45 on Jul. 6, 1997, a pan angle of 25°, a tilt angle of 0° and 3 times zooming, with intention to read three images later, the reservation command is described as follows:
<img src="http://www.foo.co.jp/R1996.7.6.13.15t1996.7.6.13.45e15P25T0Z3.gif">

As described above, if the image-sensing date or time are the same, the description of these image-sensing date or time can be omitted. In such case, the reservation command is described as follows:
<img src="http://www.foo.co.jp/R1996.7.6.13.15t....45e15P25T0Z3.gif">

The basic construction of the third embodiment is substantially the same as that of the first embodiment except the following changes.

That is, in the process procedure by the command interpreter 1012, steps S106, S111 and S112 are changed in accordance with the above reservation command. Further, step S207 in the timer program executed by the timer 1015 is changed in accordance with the above reservation command.

Further, in this case, the table format registered in the reservation register 1014 is as shown in FIG. 6.

That is, the end time and interval time of image sensing are added to the record in FIG. 3.

On the other hand, at step S106 in the command interpretation, if the reservation command has end time and interval time, the reservation is registered as programmed image sensing with the end time, the interval time, with the time of reservation as image-sensing time, and the image format, into the reservation register 1014 with the acceptance code.

Further, if the requested reservation command indicates simple reservation without end time and interval time, the image-sensing time is set as the end time, and the interval time is set to "1".

At step S111, a plurality of image data registered as "12543-1", "12543-2" . . . , having the same common part of acceptance code, similar to the second embodiment, are read, then re-formatted as a single image data including a plurality of image data, and returned via the communication interface unit 1011 to the external device 1002 requesting the image data.

At the time, as the communication interface unit 1011 uses the HTTP protocol, content-type information and status information corresponding to the image format is added to the head of the image data.

At step S112, data in the storage areas in the image memory 1019, from which the plurality of image data have been read, are deleted.

On the other hand, at step S207 in the timer program, the registered reservation information is updated with information obtained by adding the interval time in the read items of the programmed image sensing, and if the updated image-sensing time is behind the end time, the item of the image-sensing time is deleted from the reservation register 2014.

More specifically, the timer 1015 checks the contents of reservation at intervals of one minute. If the timer 1015 determines that the current time is the image-sensing time in FIG. 6, or the image-sensing time has passed (error is allowable within one minute), the image-sensing condition "P25T0Z3" is forwarded to the camera controller 1017 to perform image sensing. Then one of data as shown in FIG. 19 is stored in the image memory 1019. In FIG. 6, the interval time "15" is added to the image-sensing time "1996.7.6.13.15", thus the image-sensing time is updated to "1996.7.6.13.30", as preparation for the next image sensing. As a result, when the image-sensing time has passed the end time, the data in FIG. 6 is deleted.

The above construction enables to easily perform interval image sensing by a short reservation command.

Especially, when interval image sensing is performed for a long period, the second embodiment cannot substantially perform the image sensing due to the lengthiness of the reservation command. However, the third embodiment easily performs such image sensing if the memory capacity for storing image data is sufficient.

Fourth Embodiment

The third embodiment reads the result of interval image sensing as a plurality of still image data. Next, an example of reading the result of interval image sensing as moving image data will be described as a fourth embodiment.

Upon reading the result of interval image sensing as moving image data, the file extension is set to "mpg". For example, the reservation command is as follows:
<img src="http://www.foo.co.jp/ R1996.7.6.13.15t....45e15P25T0Z3.mpg">

Figure 7:
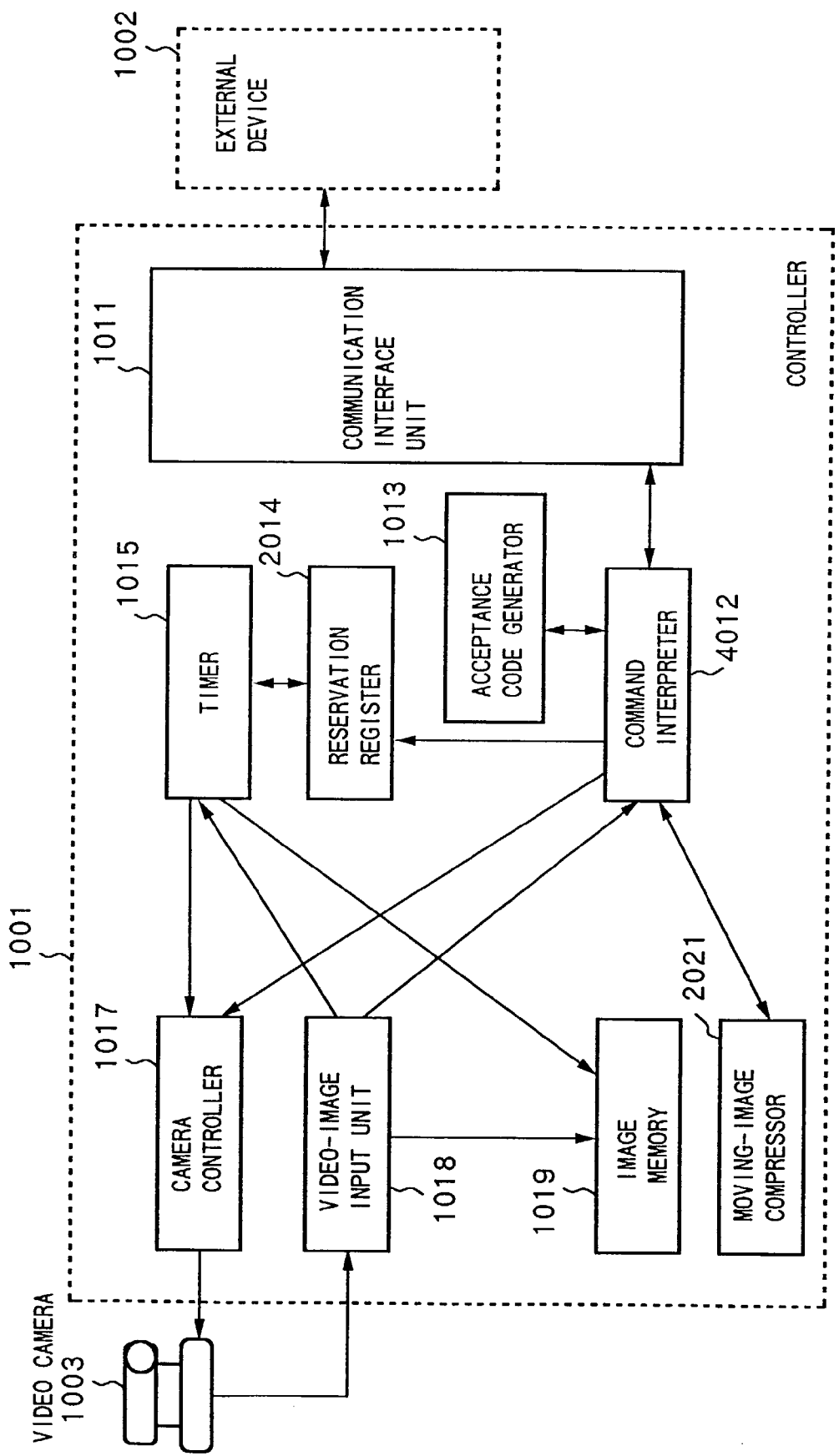
FIG. 7 is a block diagram showing the construction of the camera control apparatus according to a fourth embodiment of the present invention.

FIG. 7 shows the basic construction of the camera control apparatus according to the fourth embodiment. As shown in FIG. 7, the fourth embodiment has substantially the same construction as that of the first embodiment except the following changes.

That is, a moving-image compressor 2021 such as an MPEG1 compressing unit is added, and the command interpreter 4012 which interprets the file extension "mpg" is provided in place of a command interpreter 1012.

In this embodiment, at step S111 of the command interpretation process procedure, if the designated image format is a still image format such as "jpg" or "gif", a plurality of image data registered with the same reservation code are read, then, they are reformatted into a single image data including a plurality of image data, and the image data is returned via the communication interface unit 1011 to the external device 1002 requesting the image data.

At step S111, if the designated image format is "mpg", a plurality of image data registered with the same reservation code are read, then the images are compressed by the moving-image compressor 2021, and the compressed moving image data are returned via the communication interface unit 1011 to the external device 1002 requesting the image data.

At this time, as the communication interface unit 1011 uses the HTTP protocol, content-type information and status information corresponding to the image format are added to the head of the image data.

The above construction compresses image data by using the relation between image frames, and especially in interval image sensing with slight change, compresses image data by a large data amount. This reduces the amount of communication when the image data are read, thus greatly shortens communication time.

Fifth Embodiment

In the third embodiment, the same camera angle is designated for interval image sensing. Next, a fifth embodiment will be described as an example where repetitive image sensing by adding a definition of a control variable immediately before the image-sensing time. In the reservation command, the image-sensing condition such as a camera angle and the image format are designated after the image-sensing time, similar to the above embodiments.

The definition of the control variable is described as "$(definition main body)". The definition main body is described by two ways of representation. One description is designating an initial value, an end value, and an increment. It is further divided into two descriptions depending on whether the increment is positive or negative. The other description is designating all the values of the control variable.

$(<control variable>=<initial value>,upto<end value>, up<increment>)

$(<control variable>=<initial value>,downto<end value>, down<increment>) or $(<control variable>=<value 1>,<value 2>,<value 3>,<value4>, . . . . <value n>)

Note that <control variable>is a character string, comprising at least one alphabet letter, as an identifier of the control variable.

The reference of the control variable is described as "$(reference main body)". The reference main body is operation using the four arithmetic rules (addition, subtraction, multiplication and division) including the control variable.

For example, if image sensing is programmed with image-sensing time of 13:15 on Jul. 6, 1996, and with
  pan angle of 25°, tilt angle of 0°, and 3 times zooming,
  pan angle of 30°, tilt angle of 0°, and 3 times zooming,
  pan angle of 35°, tilt angle of 0°, and 3 times zooming, That is, to program "image sensing while changing the pan angle by 5°), with intention to read three images in "gif" format later, the reservation command is described as follows:

"http://www.foo.co.jp/R$(pan=25,upto35,up5)
  1996.7.6.13.1 5P$(pan)T0Z3.gif" or
"http://www.foo.co.jp/R$(pan=0,upto10,up5)
  1996.7.6.13.15 P$(pan+25)T0Z3.gif" or "http://www.foo.co.jp/R$(pan=35,downto25,down5)
  1996.7.6. 13.15P$(pan)T0Z3.gif" or
"http://www.foo.co.jp/R$(pan=25,30,35)
  1996.7.6.13.15P$(p an)T0Z3.gif"

Note that it is impossible to perform image sensing to obtain a plurality of video images at the same time. Actually, image sensing is performed at intervals depending on the operation speed of the camera panhead.

Figure 8:
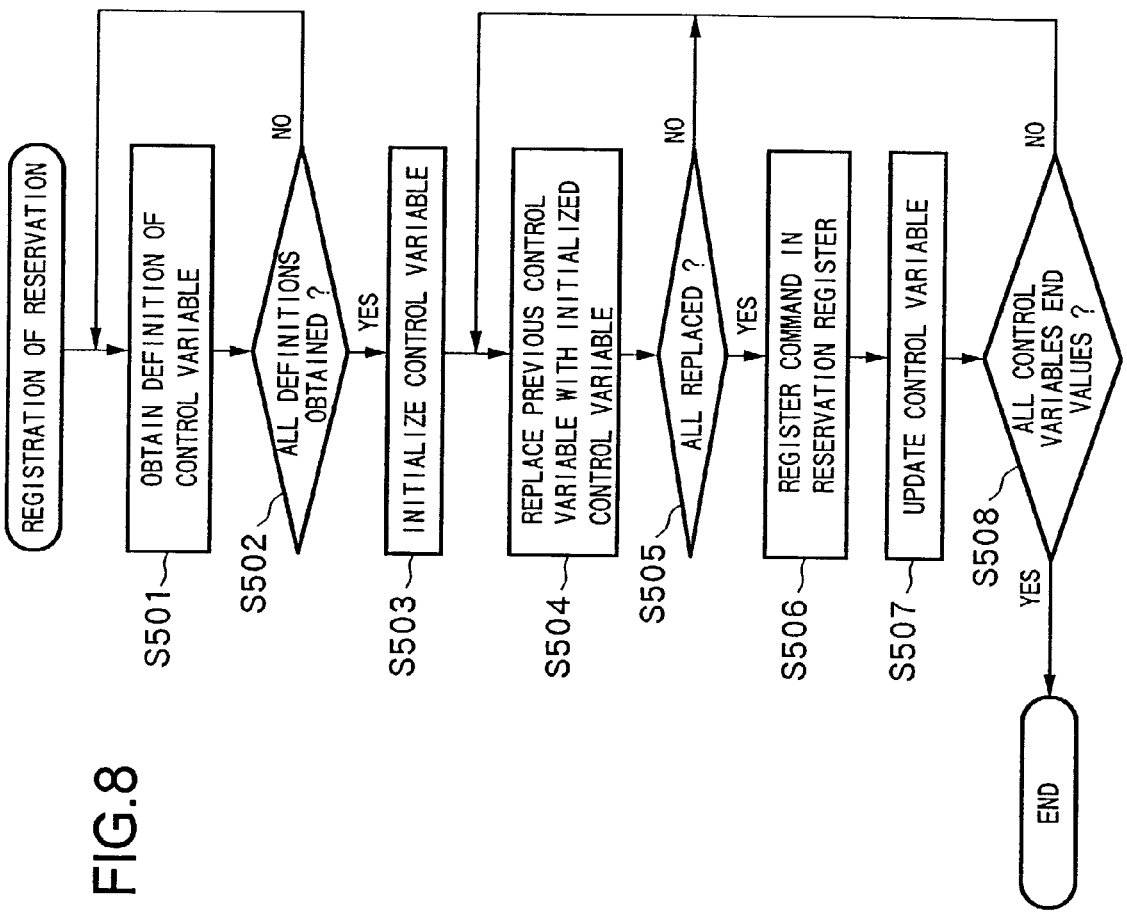
FIG. 8 is a flowchart showing a reservation registration process procedure according to a fifth embodiment of the present invention.

Although the basic construction of the fifth embodiment is the same as that of the second embodiment, step S106 in the processing procedure by the command interpretation 1012 is changed as shown in FIG. 8. Note that if the character subsequent to "R" is "$", as the definition of a control variable is described, the reservation command is described in accordance with the fifth embodiment.

First, at step S501, one control variable definition which starts with "$("and ends with")" is obtained, and at step S502, it is determined whether or not all the definitions have been obtained.

After all the definitions have been obtained, the control variable is initialized at step S503.

At step S504, the rest of the command is scanned to find a control variable reference which starts with "$("and ends with")", and previously initialized corresponding variable is replaced with the obtained control variable reference. When the replacement for the number of control variables has been completed, the process proceeds to step S506, at which the character string obtained by the above processing is interpreted as a reservation command for the above-described repetitive image sensing. Then the programmed image sensing is registered with the same reservation code generated at step S105 and image format, and with designated image-sensing times and image-sensing conditions designated by the respective reservation commands, as a plurality of reservations, into the reservation register 1014.

At step S507, the control variable at each repeated image sensing is updated to the next stage. Then the processing at step S504 and the subsequent steps is repeated until it is determined at step S508 that all the control variables have reached end values.

As a result, the reservation table as shown in FIG. 20 by interpreting the reservation command is produced. Note that as described above, although the respective image-sensing times are the same, it is impossible to perform image sensings at the same time. Actually, the image sensing is sequentially performed in the order of the numerals added to the common part of the acceptance code ("12543").

Thus, the above construction enables to easily perform interval image sensing while changing the camera angle by a short command.

Further, the present embodiment uses only one definition of control variable, however, a plurality of definitions can be described as nested definition.

In the fifth embodiment, repetitive construction is introduced; similarly, other constructions such condition-judgment, definition of variable, substitution of variable, operation using for arithmetic rules and the like, can be introduced.

That is, it may be arranged such that the command interpreter is realized as a program interpreter, to store the content of a URL as a program, and interpret and perform the program.

This enables to automatically perform even complicated camera control.

Sixth Embodiment

In the fifth embodiment, the camera angle of programmed image sensing must be designated in the same URL.

Then, a sixth embodiment will described as an example where a part of a reservation command is separately registered as a macro library.

In this embodiment, data describing image-sensing time and image-sensing condition (text file) stored in a secondary external device (arbitrary server on the network).

For the purpose of explanation, it is assumed that image sensing is programmed with image-sensing time of 13:00 on Jul. 6, 1996, while changing the camera angle by every minute as follows:

pan angle of 25°, tilt angle of 0°, 3 times zooming (Jul. 6, 1996 13:00)
pan angle of 30°, tilt angle of 0°, 3 times zooming (Jul. 6, 1996 13:01)
pan angle of 35°, tilt angle of 0°, 3 times zooming (Jul. 6, 1996 13:02)
pan angle of 35°, tilt angle of 1°, 4 times zooming (Jul. 6, 1996 13:03)
pan angle of 35°, tilt angle of 2°, 4 times zooming (Jul. 6, 1996 13:04)
pan angle of 35°, tilt angle of 3°, 5 times zooming (Jul. 6, 1996 13:05)
pan angle of 35°, tilt angle of 4°, 5 times zooming (Jul. 6, 1996 13:06)
pan angle of 35°, tilt angle of 5°, 6 times zooming (Jul. 6, 1996 13:07)
pan angle of 35°, tilt angle of 5°, 7 times zooming (Jul. 6, 1996 13:08)
pan angle of 35°, tilt angle of 5°, 8 times zooming (Jul. 6, 1996 13:09)

A file containing commands designating the above image-sensing conditions and image-sensing times is stored into the secondary external device as:
  http://www.bar.co.jp/camcon-a.ctl That is, the address of the secondary external device is "www.bar.co.jp".

In this case, the content of the file is, for example, as follows:
  R1996.7.6.13.0P25T0Z3+R1996.7.6.13.1P30T0Z3+
  R1996.   7.6.13.2P35T0Z3+R1996.7.6.13.3P35T1Z4+
  R1996.7.6.13.4P35T   2Z4+R1996.7.6.13.5P35T3Z5+
  R1996.7.6.13.6P35T4Z5+R1996.7.   6.13.7P35T5Z6+
  R1996.7.6.13.8P35T5Z7+R1996.7.6.13.9P35T5Z 8.gif The reservation command to be provided to the camera control apparatus starts with "%23(", then has the URL, and ends with ")". In the above case, as it is necessary to inform the address of the command file, the reservation command is described as follows:
"http://www.foo.co.jp/%23(httpd%3A//www.bar.co.jp/cam-
  con-a.ctl)"

Figure 9:
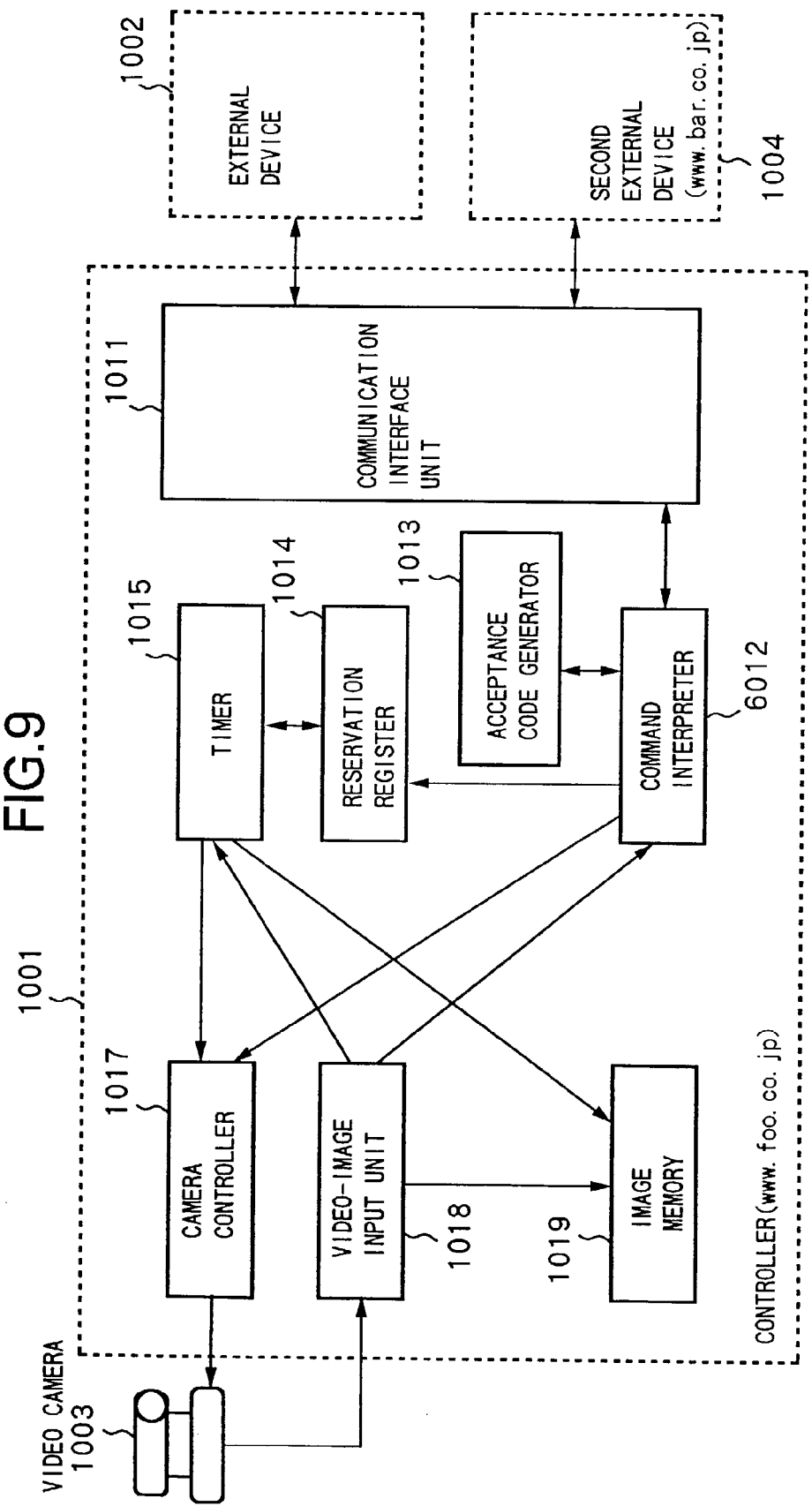
FIG. 9 is a block diagram showing the construction of the camera control apparatus according to a sixth embodiment of the present invention.

The basic construction of the sixth embodiment is as shown in FIG. 9. In comparison with the fifth embodiment, difference is that a command interpreter 6012 interprets the above reservation command and the camera control apparatus is connected to a secondary external device (a server in which the file including the command character string is stored) 1004.

Figure 10:
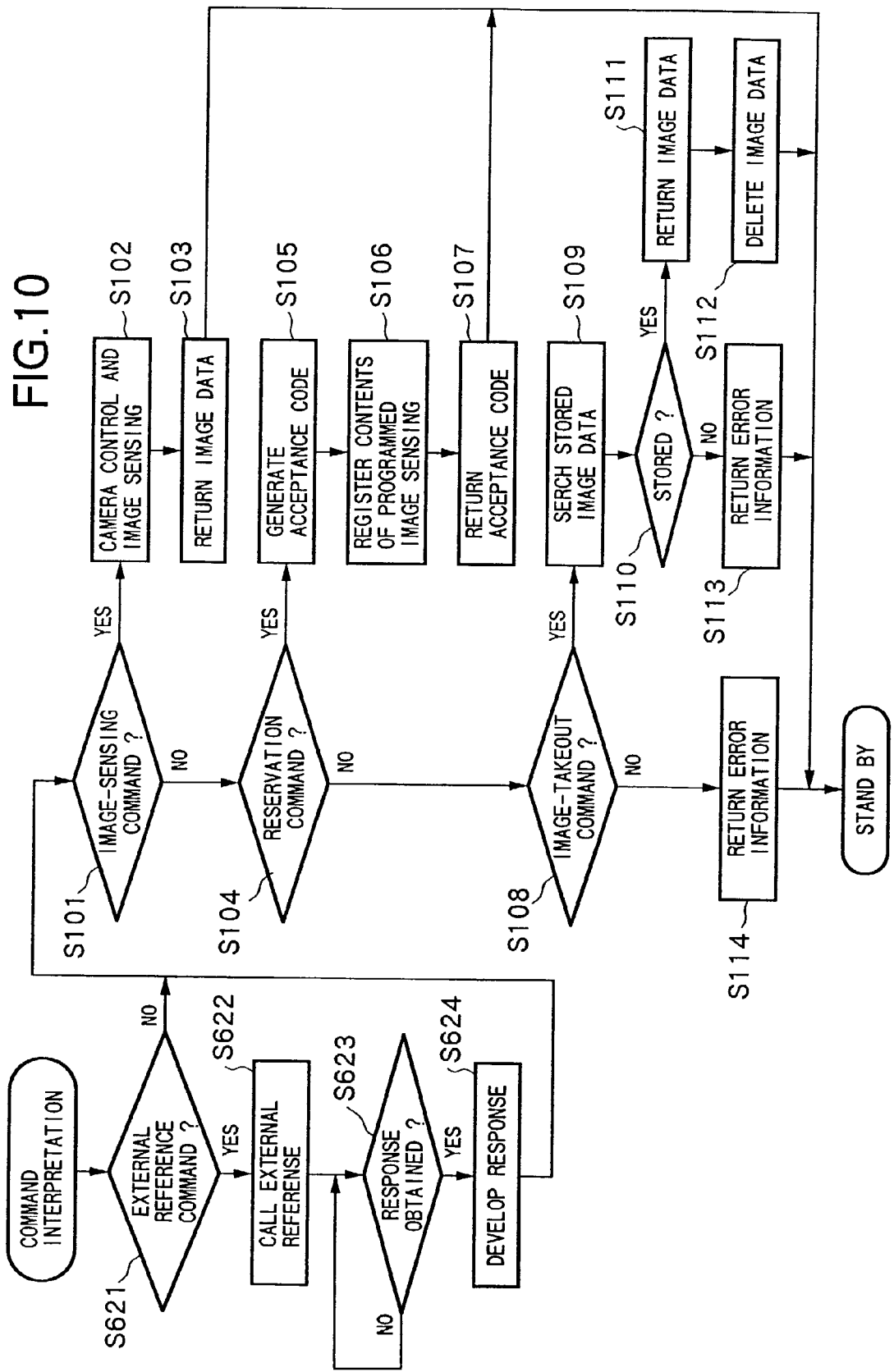
FIG. 10 is a flowchart showing a control-variable replacement process procedure according to the sixth embodiment.

Next, the operation of the command interpreter 6012 will be described with reference to the flowchart of FIG. 10.

At step S621, if the head of the command is "%23", it is recognized as an external reference command, then process proceeds to step S622.

At step S622, a bracketed description "( )" is regarded as a URL designating the stored file in which the command is described, and a file transfer request is issued in accordance with the URL. In the above case, as the file "camcon-a.ctl" is stored at "www.bar.co.jp", the file transfer request is sent to the secondary external device 1004 in FIG. 10.

At step S623, a response is awaited. As a result, a long reservation command as above is returned. The returned reservation command is developed by interpreting the external reference command and replacing it in the developed command, for use in the subsequent command interpretation (step S624). Then the process proceeds to step S101.

Note that at step S621, if the command is not an external reference command, the process also proceeds to step S101. The processing at step S101 and the subsequent steps is identical to that described in the first embodiment, therefore, explanation of those steps will be omitted.

Further, the processing at steps S621 to S624 can be applied to the second to fifth embodiments as well as the first embodiment.

The above construction enables to easily perform interval image sensing programmed with complicated changes of time and camera angle by a short command.

Especially, in accordance with the sixth embodiment, in a case where a plurality of camera control apparatuses (i.e., a plurality of cameras) are provided on the Internet, an image in the same image-sensing status can be obtained by the respective camera control apparatuses by using a file describing a reservation command of programmed image sensing which is stored into only one server.

For example, even when a plurality of camera control apparatuses are provided at various places in various countries, images can be obtained by their own respective image-sensing conditions, and further, an image can be obtained in accordance with image-sensing condition registered by a third person.

In the sixth embodiment, the camera control apparatus and the external apparatus holding the camera control file are described as separate apparatus, however, they may be integrated as a single apparatus. In this case, the URL is described as follows:

"http://www.foo.co.jp/%23(http%3A//www.foo.co.jp/camcon-a.ctl)"

Otherwise, in case of the same URL:

"http://www.foo.co.jp/%23(camcon-a.ctl)"

If the command is stored in the external device to which an image transfer request is issued, the address of the device can be used. In such case, the secondary external device is unnecessary.

Further, although not especially described in the present embodiment, if a plurality of camera-control right requests (i.e., request for right to the change camera angle and the like and transfer the obtained video image) have been issued by a plurality of end users at the same time, the camera control right is given to one of them. It is arranged, for example, such that the user whose request has been first stored in the queue of requests can obtain the camera control right. Otherwise, it may be arranged such that a specific user or the like can obtain the camera control right prior to other users.

However, the camera control right is not directly related with the present invention, therefore, further explanation of the camera control right will be omitted.

As described above, according to the first to sixth embodiments, it is possible to provide an end user with environment to easily remote-control a video camera via a general network such as the Internet.

Seventh Embodiment

In the above first to sixth embodiments, reserved image sensing cannot always be performed as programmed depending on the contents of programming such as designation of time, camera angle and the like. For example, in a case where image sensing is programmed in different directions with the same image-sensing time, as a plurality of reservations, all the reserved image sensing cannot be performed.

Further, to display a desired video image, it is necessary for an end user to generate an HTML document including an acceptance code by using a CGI program or input an acceptance code corresponding to the desired video image. However, it is difficult to prepare the CGI program, further, the end user may often make mistakes in inputting the acceptance code, which degrades operability and utility of the camera control apparatus.

Then, a seventh embodiment has an object to provide a camera control apparatus and method, which is used in a system where camera image-sensing condition and the like can be remote-controlled on a predetermined network, and which notifies overlap of image-sensing programming if occurred.

Further, the seventh embodiment has another object to provide a camera control apparatus and method which unnecessitates inputting an acceptance code and dynamically generating an HTML document by a CGI program, and which enables to easily display a desired video image.

Figure 11:
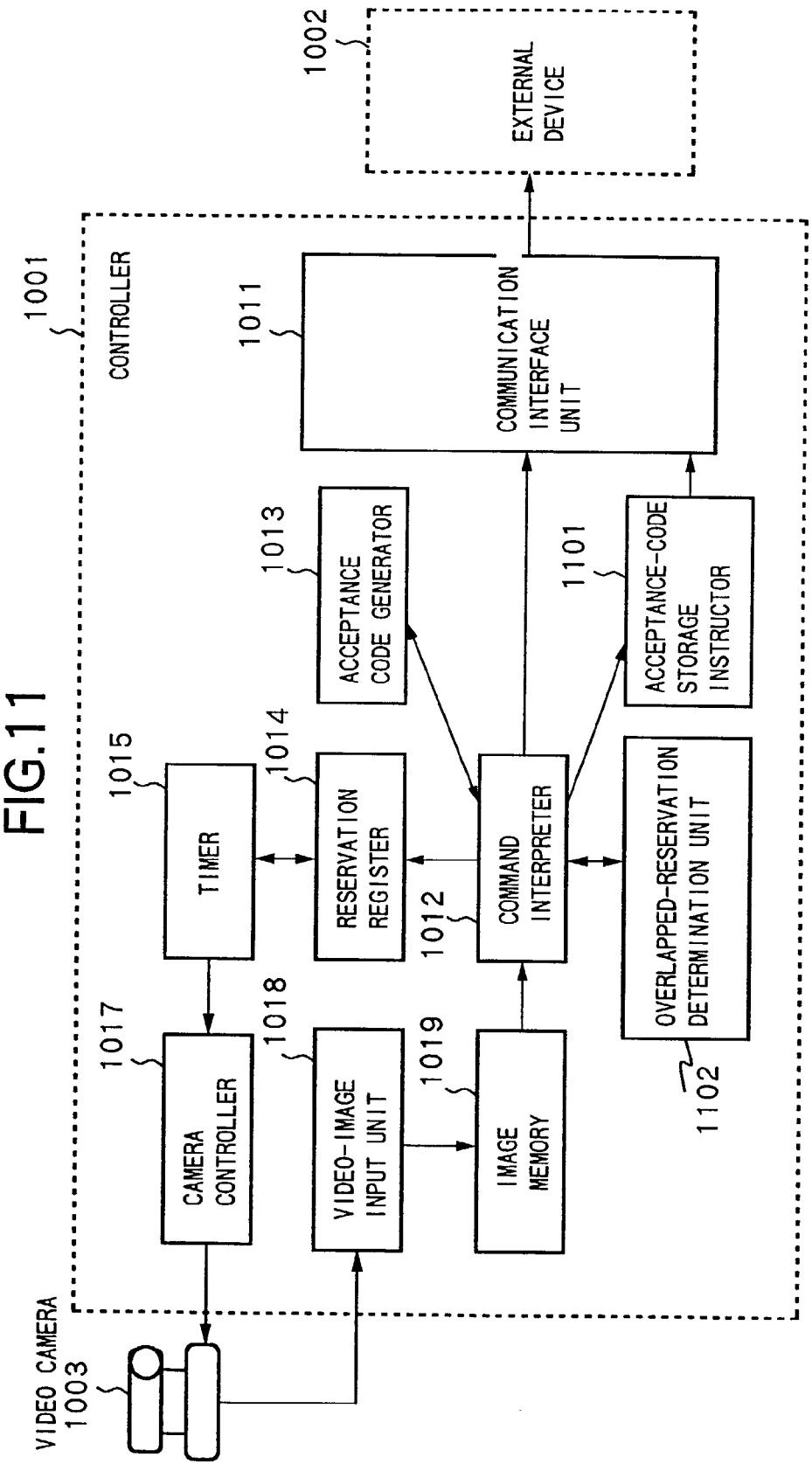
FIG. 11 is a block diagram showing the construction of the camera control apparatus according to a seventh embodiment of the present invention.

FIG. 11 is a block diagram showing the construction of the camera control apparatus according to the seventh embodiment of the present invention. In comparison with FIG. 1, difference is that an acceptance-code save instructor 1101 and an overlapped-programming judgment unit 1102 are added to the construction in FIG. 11. Further, the connection among the elements is different from that in FIG. 1. The functions of the elements in FIG. 11 except the acceptance-code save instructor 1101 and the overlapped-programming judgment unit 1102 are the same as those in FIG. 1.

Further, the basic operation of the present embodiment corresponds to that in the first to sixth embodiment. Hereinafter, the characteristic processing of the seventh embodiment will be described.

Figure 12:
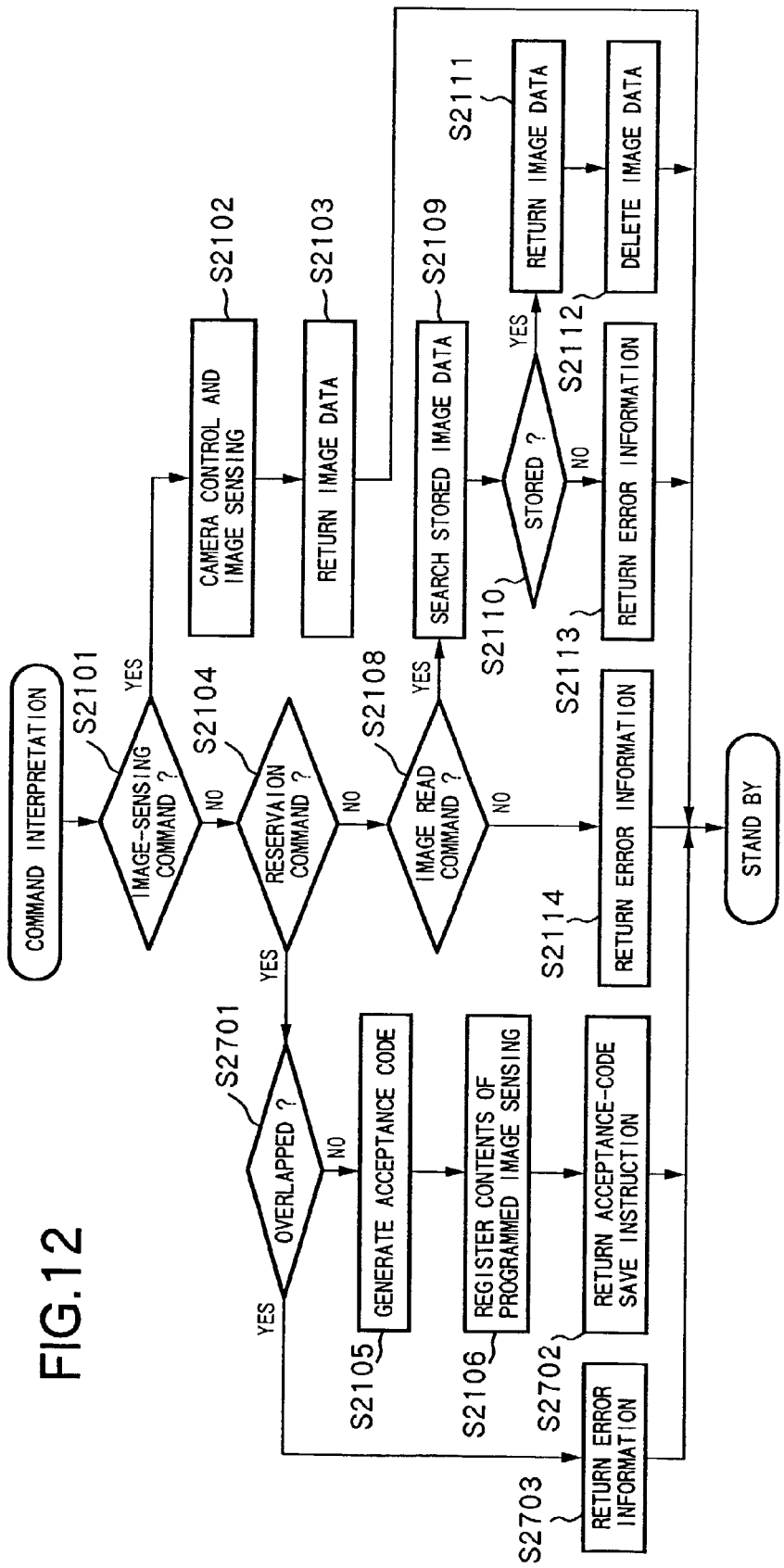
FIG. 12 is a flowchart showing a process procedure of the command interpreter according to the seventh embodiment.

FIG. 12 is a flowchart the control process procedure by the command interpreter 1012 according to the seventh embodiment as the characteristic processing.

First, at step S2101, a command described as a file name is interpreted. If the head of the request is "P", the command is recognized as an image-sensing command, then process proceeds to step S2102. At step S2102, the camera 1003 is controlled with the designated pan, tilt and zoom values by the camera controller 1017. At step S2103, the obtained image is converted into data of the designated image format, and the image data is returned via the communication interface unit 1011 to the external device 1002 requesting the image data. The external device 1002 stores the image data, and transfers it to the request originator. At this time, as the communication interface unit 1011 uses the HTTP protocol, content-type information and status information corresponding to the image format are added to the head of the image data. Then the process ends.

This enables to paste a video image obtained by programmed image sensing in an HTML document as if it is image data stored in a file in a WWW server.

At step S2101, if the head of the request is "R", the command is recognized as a reservation command designating image-sensing time, then the process proceeds to step S2701 via interpretation at step S2104.

Similar to the first embodiment, a reservation command starts with alphabet "R", then it continues with integers indicating year, month, day, hour and minute, each terminated with a period, then with image-sensing condition such as designation of panning, tilting and zooming, and ends with an extension indicating the image format. Note that if there is no image-sensing condition, the camera angle at the programmed image-sensing time is adopted.

For example, if image sensing is programmed with respect to the camera control apparatus 1001 having a network address "www.foo.co.jp", with image-sensing time of 13:15 on Jul. 6, 1996, a pan angle of 25°, a tilt angle of 0°, and 3 times zooming, and "gif" format, the reservation command is described as follows:

<img src="http://www.foo.co.jp/R1996.7.6.13.15P25T0Z3.gif">

(1)

Note that this URL may be directly designated by the user, otherwise may be combined by an HTML form or a CGI program.

When the reservation command as above has been designated with respect to the camera control apparatus 1001, the process proceeds to step S2701, at which it is determined by the overlapped-reservation determination unit 1102 whether or not there is overlap in designated image-sensing time (in this case 13:15 on Jul. 6, 1996). If the image-sensing time is overlapped with image-sensing time of another reserved programming, the process proceeds to step S2703, at which information indicating that the reservation cannot be accepted is returned via the communication interface unit 1011 to the external device 1002 requesting the reservation.

If there is no overlapped reservation and it is possible to reserve the programmed image sensing with the designated time, the process proceeds to step S2105, at which a unique identification number is received as an acceptance code, from the acceptance code generator 1013. The unique identification number may be generated by using a counter incremented by one (+1) at each generation request, otherwise, by using numerical values indicating requested date and time.

At step S2106, the acceptance code and information on the designated time, the image-sensing condition and the image format are registered in the storage device (not shown) of the reservation register 1014. At step S2702, the acceptance code (code notifying that the reservation has been accepted), and an acceptance-code save instruction to be described later, are returned by the acceptance-code save instructor 1101, via the communication interface unit 1011 to the external device 1002 requesting the reservation.

As a result of reservation processing as above, various types of information are stored in table format as shown in FIG. 3, in the storage device of the reservation register 1014. Note that in the present embodiment, the storage device of the reservation register 1014 is used for storing the above information, however, the image memory 1019 of the camera control apparatus 1001 may be used for this purpose, and further, the image memory 1019 may be any type of memory. Returning to FIG. 3, the table contains the contents of programmed image sensing in accordance with the description in the first embodiment. In this embodiment, the acceptance code is "817b7abda9304a1a15d4546ca779bc16", for example. The registered contents include the image-sensing date and time, the acceptance code, the image-sensing condition and image format. At the above overlapped-reservation judgment, the overlapped-reservation determination unit 1102 compares "image-sensing time" registered in the reservation register 1014 with "image-sensing time" designated by the current reservation command, and determines whether or not they overlap with each other. Note that the present embodiment can set zooming, panning and tilting of the camera 1003 in one minute intervals, therefore overlapped reservation is examined in minute unit.

After the above reservation processing, when the image-sensing time registered in the reservation register 1014 has come, the camera control apparatus 1001 controls the camera 1003 at the designated camera angle to perform the programmed image sensing, and stored the obtained image with an appropriate file name such as an acceptance code, in the designated image format, into the image memory 1019. Thereafter, when an image read command is received from the external device 1002, image data corresponding to the image read command is read from the image memory 1019, and the image data is transferred to the external device 1002 (corresponding to the terminal of an end user) in the designated format.

Note that the image read command starts with its path name "G", then it continues with an acceptance code, and ends with an extension indicating the image format. Note that this acceptance code has been returned to the external device 1002 at step S2702 upon reservation. For example, if "817b7abda93043a1a15d4546ca779bc16" is returned as an acceptance code, to read an image resulted from the programmed image sensing, the image read command is described as follows:

<img src="http://www.foo.co.jp/G/817b7abda93043a1a15d4546ca77 9bc16.gif">(2)

Note that the character string indicating image formation (the image format "gif") at the end of the image read command must be the same as that in the reservation. However, it may be arranged such that if they are different, the camera control apparatus 1001 converts the corresponding image data stored in the image memory 1019 with the reservation code into image data in the designated image format and transfers the converted image data.

The image memory 1019 manages image data in the table format as shown in FIG. 14, for example. The table contains an acceptance code (which corresponds to a reservation command, similar to a file name), an image format, and actual image data. Note that the image memory 1019 may be any type of storage device so far as it has a sufficient capacity. Specifically, the image memory 1019 is a hard disk device, a magneto-optical disk device or the like.

Next, returning to FIG. 12, the command interpretation process procedure in a case where an image read command has been actually received will be described.

At step S2101, if the path name of the command is "G", the process proceeds to step S2104. As it is determined that the command is not a reservation command (NO at step S2104), the process proceeds to step S2108. As it is determined that the command is an image read command, the process proceeds to step S2109, at which the image memory 1019 is searched for corresponding image data, based on an acceptance code included in the image read command (although described later, the acceptance code is added as a "Cookie" header).

Then at step S2110, it is determined whether or not the image data obtained from the above search is stored with the same acceptance code as that described in the image read command. If YES, the image data is read, and transferred via the communication interface unit 1011 to the external device 1002 requesting the image data. At this time, as the communication interface unit 1011 uses the HTTP protocol, content-type information and status information corresponding to the image format are added to the head of the image data (at step S2111). At step S2112, data stored in the storage area in the image memory 1019, from which the image data has been read out, is deleted. Then the process ends.

If it is determined at step S2110 that image data corresponding to the designated acceptance code is not stored, as the corresponding image data has not been image-sensed, otherwise the image data has already been transferred and deleted, error information is returned via the communication interface unit 1011 to the external device 1002 requesting the image data. Then the process ends.

If it is determined at step S2108 that the request from the external device 1002 is not an image read command, error information indicating that the command is an undefined command is returned via the communication interface unit 1011 to the external device 1002. Then the process ends.

As described above, information exchange between the external device 1002 and the camera control apparatus 1001 according to the present embodiment is performed.

Figure 5:
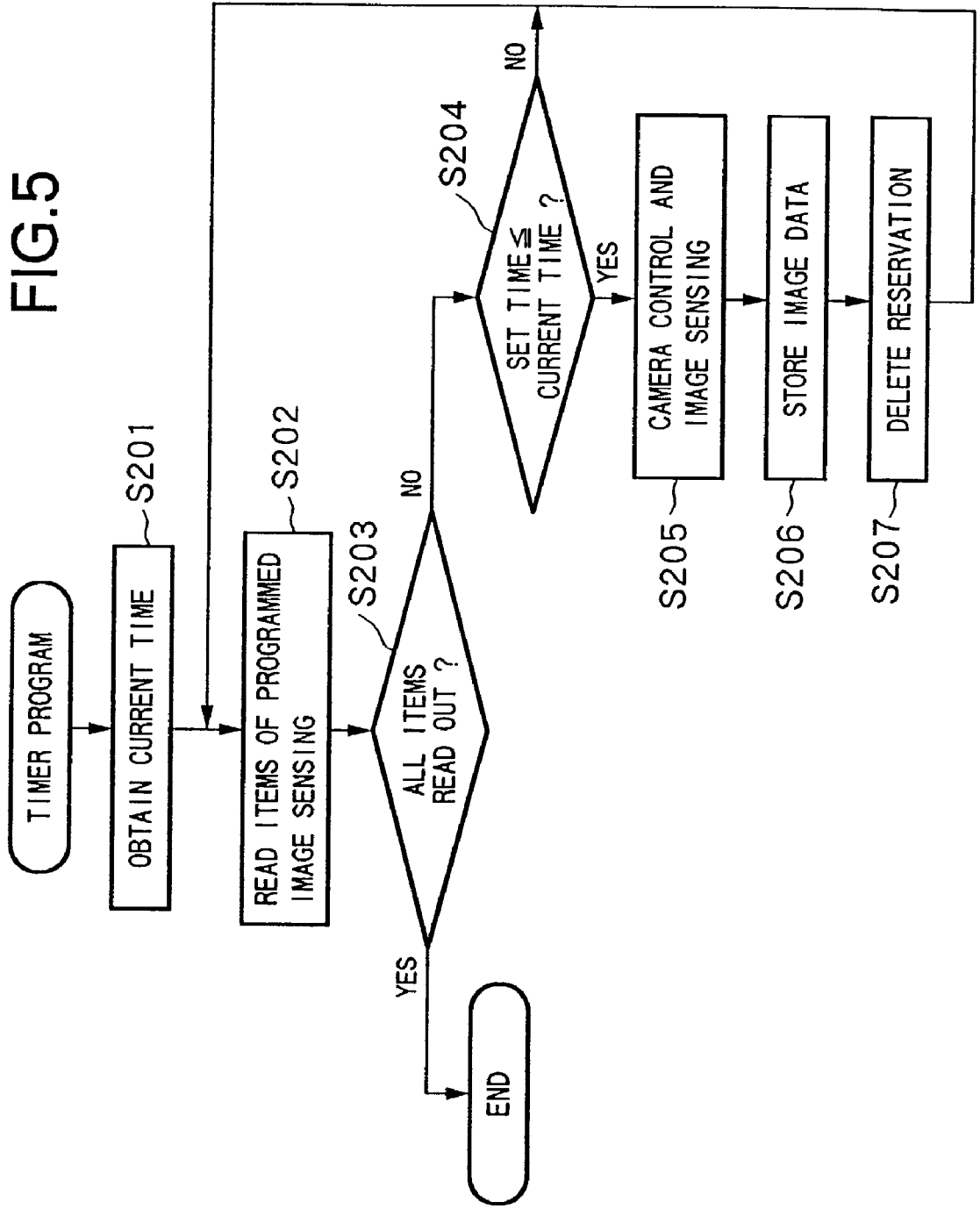
FIG. 5 is a flowchart showing a process procedure of a timer according to the first embodiment.

Note that as the timer 1015, used for camera control, image sensing and storing the result of image sensing, based on reservation data registered in the reservation register 1014, is the same as that in FIG. 5, explanation of the timer 1015 will be omitted.

In the present embodiment, the instruction to save an acceptance code by the acceptance-code save instructor 1101 is made in the format of "Cookie". That is, in the HTTP response header, "Set-Cookie" header is used to instruct to save the acceptance code as follows:

Set-Cookie: ID=817b7abda93043a1a15d4546ca779bc16; path=/G/; domain=www.foo.co.jp (3)

This means that the acceptance code (ID) is "817b7abda93043a1a15d4546ca779bc16" and when accessing "http://www.foo.co.jp" in the format "http://domain/path", the above acceptance code is to be added.

Figure 15:
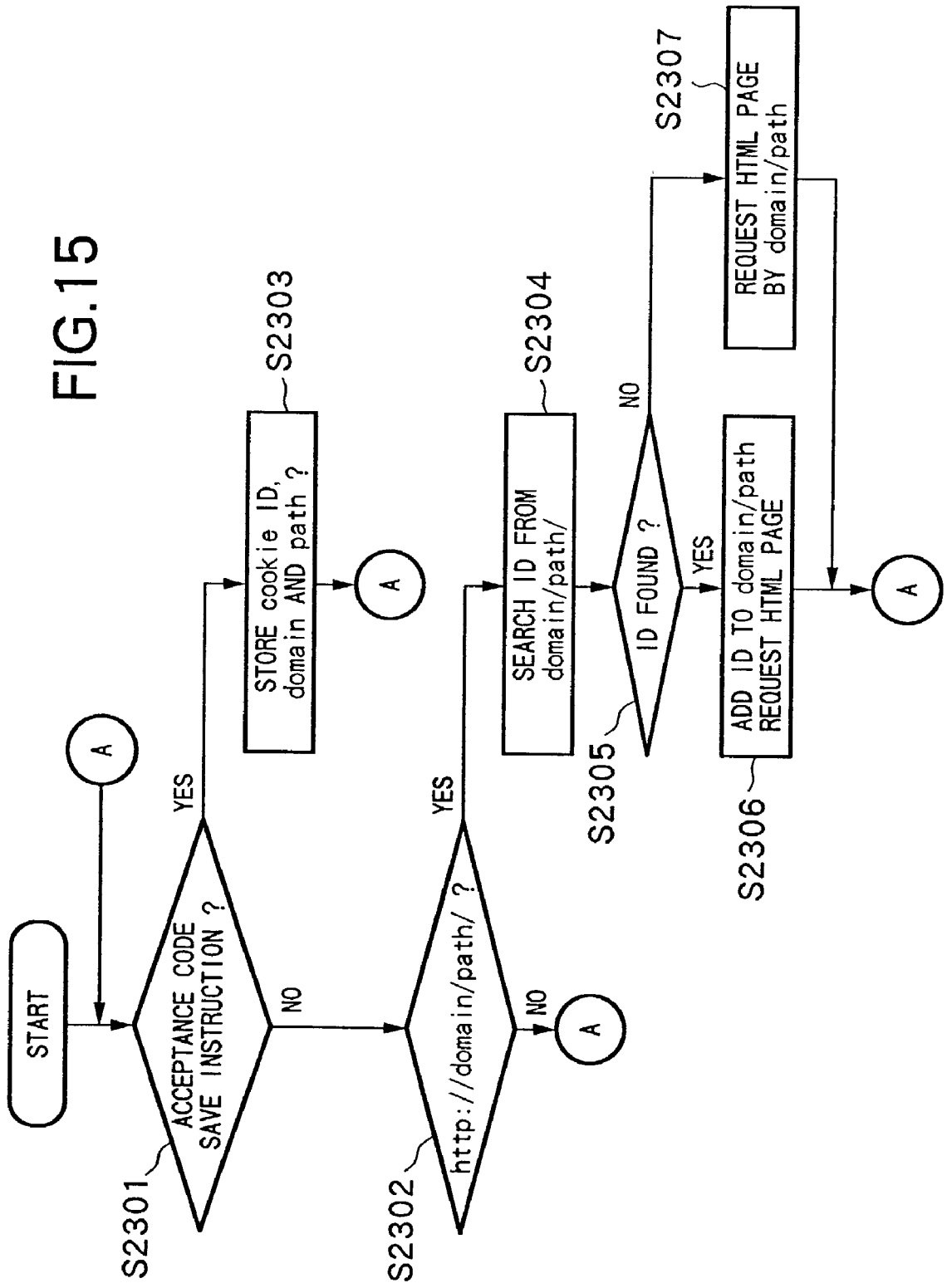
FIG. 15 is a flowchart showing a control procedure of an external device according to the seventh embodiment.

Next, a control process procedure of the external device 1002 will be described with reference to the flowchart of FIG. 15. Note that FIG. 15 shows processing when an acceptance code has been received, and processing when accessing is performed by designating a URL. The external device 1002, which has received an acceptance-code save instruction, stores the acceptance code (ID), domain and path (steps S2301 and S2303) in case of displaying a video image, to be obtained by programmed image sensing, by a WWW browser as a client.

When the obtained video image is displayed by the external device 1002, a request is sent to the camera control apparatus 1001 by using a URL as follows:

http://www.foo.co.jp/G (4)

When the user of the WWW browser designates the URL by the description (4), it is determined whether or not there are corresponding domain and/or path among the stored domains and paths (step S2305). If no corresponding domain nor path has been found, an HTML page is requested by the designated domain and path.

On the other hand, if there are domain and path corresponding to the designated URL, an acceptance code (ID) corresponding to the domain and path is obtained. Then, upon requesting an HTML page by the designated URL, "Cookie" header is included in the request header, and the acceptance code is sent in the following format:

Cookie: ID=817b7abda93043a1a15d4546ca779bc16 (5)

This means that the acceptance code is 817b7abda93043a1a15d4546ca779bc16.

The URL (=http://www.foo.co.jp/G/) used for requesting the video image is uniquely designated to each acceptance code. As the external device 1002 automatically sends an acceptance code, the user does not have to input the acceptance code, nor dynamically generate an HTML document corresponding to the acceptance code.

In the camera control apparatus 1001, that has receives the request in the above format, it is determined at step S2108, as described above, that the request is a video-image read request, then the process proceeds to step S2109. The acceptance code is read from the request header, and the process proceeds to step S2110.

Figure 16:
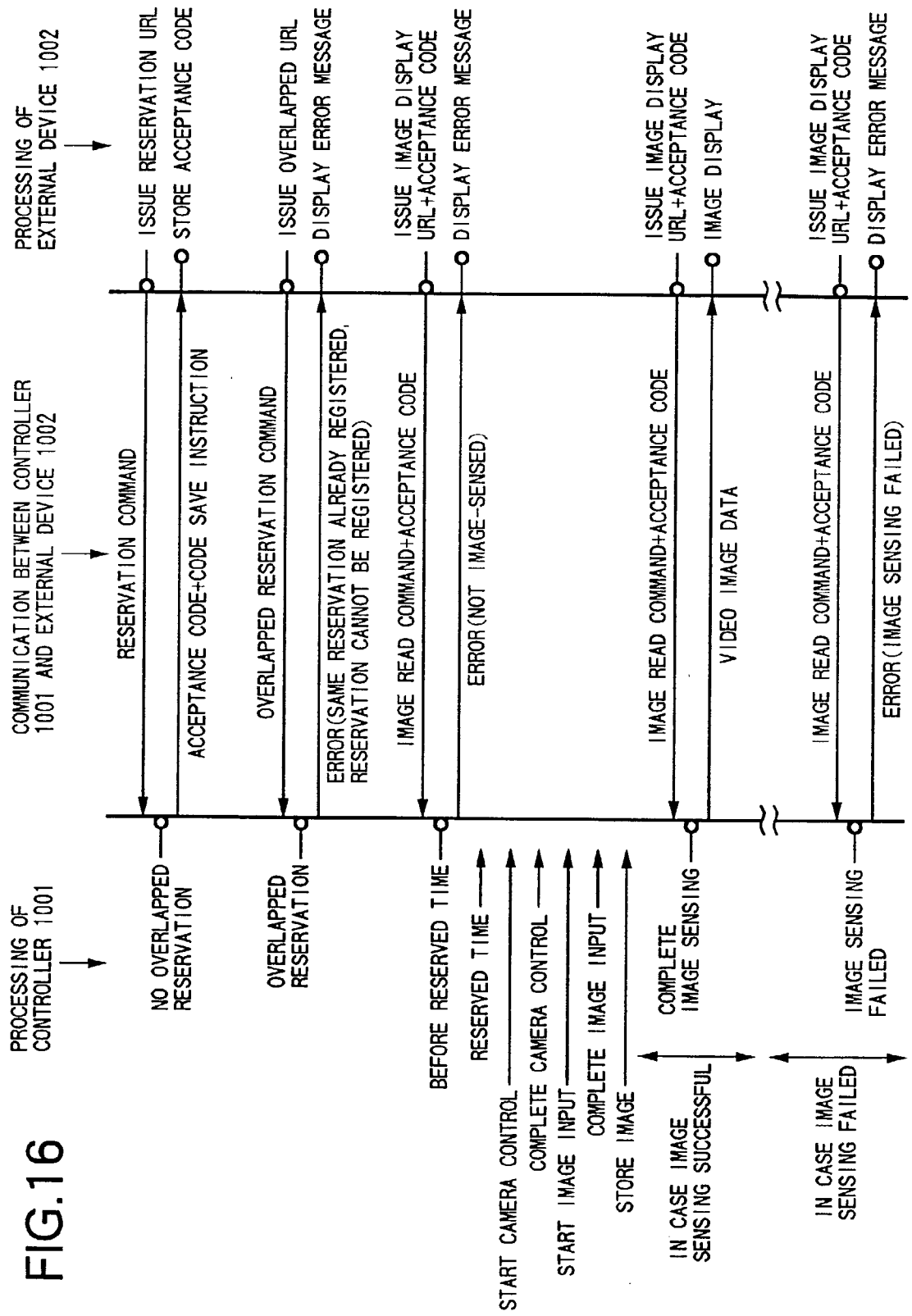
FIG. 16 is a timing chart showing the contents of communication between the camera control apparatus and the external device according to the seventh embodiment.

FIG. 16 shows the contents of communication between the camera control apparatus 1001 and the external device 1002 according to the seventh embodiment. When the external device 1002 issues a reservation URL as above description (1) to reserve programmed image sensing, the camera control apparatus 1001 determines whether or not there is overlap in the reservation (step S2701). If there is no overlap, the camera control apparatus 1001 returns an acceptance code and an acceptance-code save instruction (in, e.g., "Cookie" format) to the external device 1002 (step S2702). If the external device 1002 issues a reservation command designating programmed image sensing having an overlap with another programmed image sensing, the camera control apparatus 1001 detects the overlap in the reservation, and returns error information (step S2703). The external device 1002 displays the error information on, e.g., a display device.

After the reservation has been registered, if the URL for image display is designated by the external device 1002 before the designated time, error information is returned (step S2113). Then, the external device 1002 displays the error information again.

On the camera control apparatus 1001 side, the timer 1015 detects the designated time. When the designated image-sensing time has come, the camera controller 1017 starts to control the camera 1003 (in the present embodiment, panning, tilting and zooming). When the camera control has been completed, the video-image input unit 1018 starts to input the obtained image, then the image memory 1019 stores the input image.

At or after the designated time, when the URL for image display is designated by the external device 1002, the camera control apparatus 1001 pastes the image into a designated HTML page, and sends the HTML page to the external device 1002 (step S2111). The external device 1002 displays the image as reserved by displaying the HTML page. Note that as shown in FIG. 16, it may be arranged such that when image sensing at the designated time has failed, error information is returned with respect to the image read command.

Note that a validity expiration time may be designated by designating "expires". In this case, the obtained image is stored by the validity expiration time, and when the validity expires, the stored image is deleted. Further, if image sensing has failed for some reason, the reservation of the image sensing is held by the validity expiration time, and as response, the content of error can be informed in detail with respect to image read request.

Figure 17:
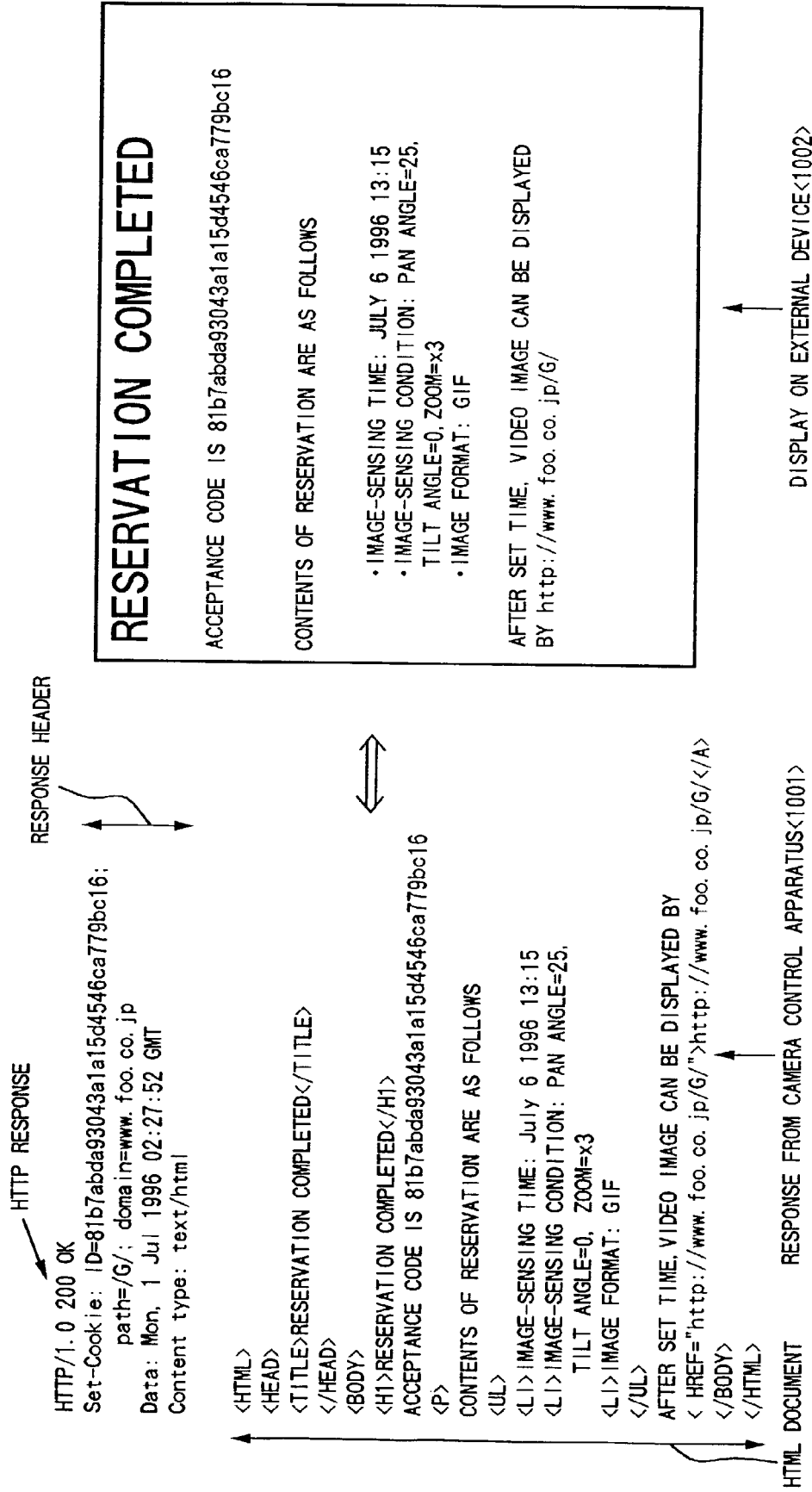
FIG. 17 is a sample of an HTTP response issued to the external device when reservation has been successful, with a display sample on the external device based on the response.
Figure 18:
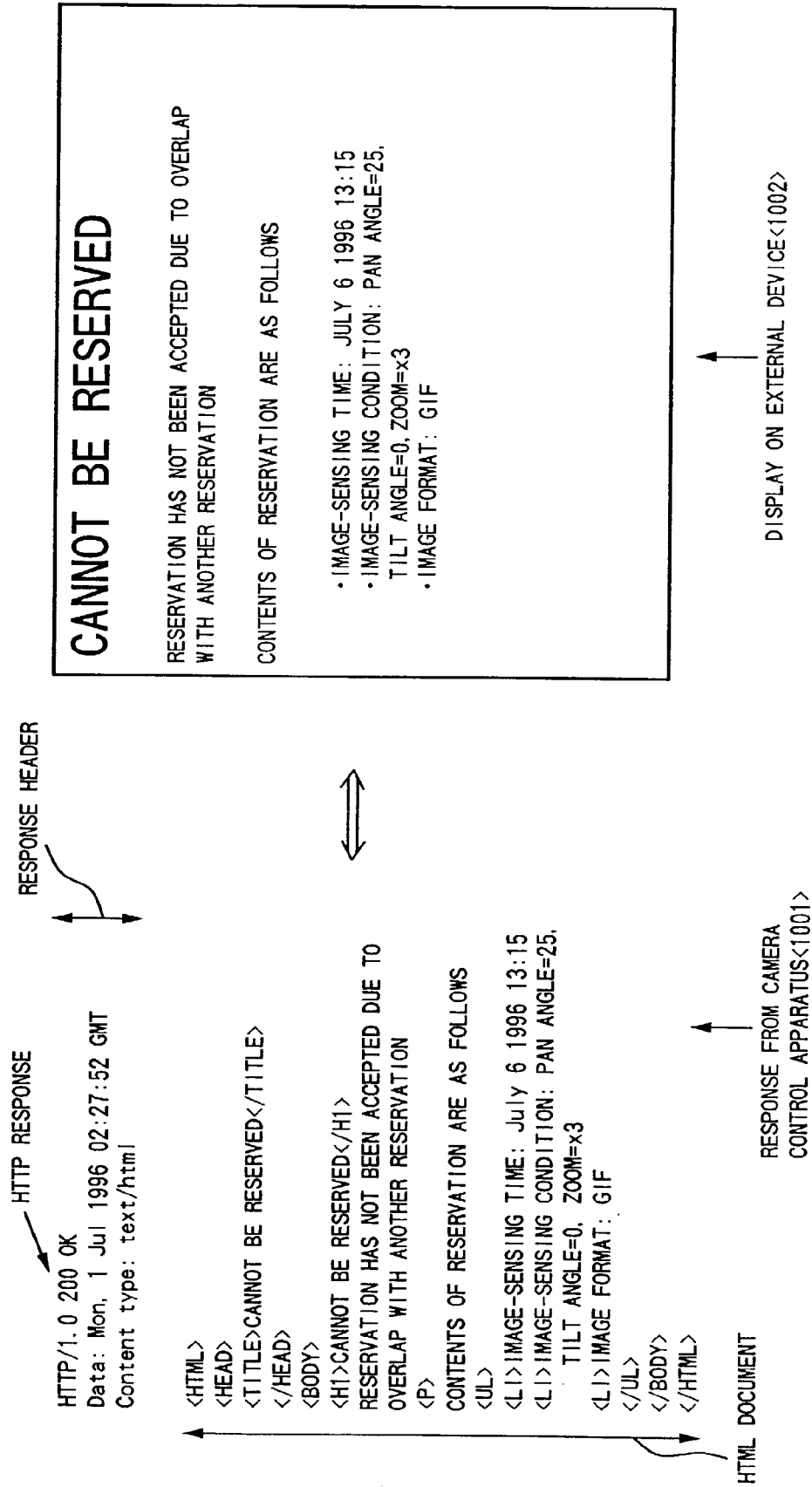
FIG. 18 is a sample of an HTTP response issued to the external device when reservation has failed, with a display sample on the external device based on the response.

At steps S2702 and S2703, the content of the response to the external device 1002 may be only status information indicative of the completion of acceptance, however, an HTML document explaining the user the situation may be included in the response. FIGS. 17 and 18 show such HTML documents. FIG. 17 shows an HTTP response issued to the external device 1002 at step S2702 when the reservation has been successful, and the display status of the external device 1002 in accordance with the response. As described above, the response header includes "Set-Cookie" header. FIG. 18 shows an HTTP response issued to the external device 1002 at step S2703 when the reservation has failed, and the display status of the external device 1002 in accordance with the response. Thus, as the content of reservation can be confirmed, operability can be improved.

As described above, according to the seventh embodiment, live image obtained by controlling a remote camera can easily be pasted in a WWW document, by connecting the camera control apparatus to a WWW system network, and describing a URL including image-sensing condition, as image data source, in the address of the camera control apparatus.

Further, it is possible to reserve programmed image sensing with respect to the camera control apparatus 1001, read the result of the image sensing into a WWW page, and display the WWW page later. Especially, when the network is overcrowded, image data cannot be smoothly obtained by controlling a remote camera since image transfer takes much time, however, according to the present embodiment, programmed image sensing at a specific camera angle for a necessary time, in such time when the network is overcrowded, is reserved in advance, and when the network becomes less crowded, e.g., at midnight.

Especially, it is greatly advantageous that a plurality of images can be image-sensed at short intervals with the same camera angle, regardless of the transmission capacity of the network.

In the present embodiment, the interface between the camera control apparatus 1001 and the external device 1002 has been described as the HTTP protocol, however, any communication interface can be employed.

Further, it may be arranged such that upon notifying an acceptance code to the reservation originator, a password is issued, and when image data obtained by programmed image sensing as reserved is read, the image data can be transferred with the password besides the reservation/acceptance code. This avoids at least the inconvenience that desired image data has been deleted since a third person issued a transfer request with the same acceptance code.

Further, image-sensing time is designated in minute unit, however, it may be designated in second or millisecond unit. In this case, if image sensing cannot be performed at intervals of the maximum period or longer necessary for camera-angle control and image sensing, it is determined that image-sensing time is overlapped.

In the present embodiment, to indicate the image format, the extension "gif" is employed; it may be arranged such that the image format indicated by the extension "gif" is arbitrarily changed to the JPEG format indicated by an extension "jpg".

Further, the file name is regarded as a command, however, a parameter description of a URL can be utilized.

For example, panning, tilting, zooming and image format are respectively set to "25°", "5°", "twice" and "gif", image sensing can be programmed by the following description:
<img src="http://www.foo.co.jp/cameraimage?P=20,T=5, Z=2,F=gif ">

Further, a WWW server may be installed into the camera control apparatus of the present embodiment. In this case, for example, a name "camctl.exe" is given to the program of the command interpreter 1012 as a CGI program for the WWW server, and the image sensing can be programmed by the following description:
<img src="http://www.foo.co.jp/cgibin/camctl.exe?P=20, T=5,Z=2,F=gif">

Furthermore, in the present embodiment, once the image data obtained by programmed image sensing has been transferred, the image data (file) is deleted, however, the image data is not necessarily deleted at this time.

That is, it may be arranged such that the image data, obtained by reserved image sensing and stored as a file, is held for an appropriate period, and when the period has elapsed, the image data is deleted even if the image data has not been transferred. This allows a plurality of end users to obtain the same image.

Further, it may be arranged such that a password is issued to the end user according to circumstances, and the image data is transferred only when the password coincides with that of the image data.

Eighth Embodiment

In the seventh embodiment, the "Cookie" function is used for acceptance-code save instruction, however, this instruction is not limited to the above function. For example, a "Plug-in" for accepting an acceptance-code save instruction may be provided on the browser side. In this case, a URL including an acceptance code is saved in a bookmark, so that the browser (external device 1002) can send a request to display a video image by selecting the URL from the bookmark even if it has no function to automatically transmit an acceptance code.

As described above, according to the seventh and eighth embodiments, in a system for image-sensing a video image by controlling a camera via a network, overlap in reservation of programmed camera control and image sensing condition can be avoided.

Further, according to the above embodiments, upon displaying a video image obtained by programmed image sensing, it is unnecessary to input the acceptance code that has been notified when the programmed image sensing was reserved. Further, on the server side, it is unnecessary to dynamically generate an HTML document by a CGI program or the like. For this reason, the operability on the user side can be improved, and the construction on the server side can be simplified, which enables to easily display a video image obtained from programmed image sensing.

Note that the present invention can be applied to a system constituted by a plurality of devices or to an apparatus comprising a single device.

Further, the object of the present invention can be also achieved by providing a storage medium storing program codes for performing functions of the aforesaid first to eighth embodiments to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As described above, according to the seventh and eighth embodiments, when overlap occurs in image-sensing reservation, it is possible to notify of the overlap, thus improves operability of reservation of programmed image sensing by a remote-controllable camera.

Further, according to the seventh and eighth embodiments, upon displaying a video image obtained by programmed image sensing, as it is unnecessary to input an acceptance code or dynamically generate an HTML document by a CGI program, the desired video image can be easily displayed.

As many apparently widely different embodiments of the present invention can be made without departing from the spirit and scope thereof, it is to be understood that the invention is not limited to the specific embodiments thereof except as defined in the appended claims.

What is claimed is:

1. A control apparatus, connected to a network, which obtains image data sensed by an image sensing device, comprising:

a communication device adapted to receive, from an external device, a reservation command which designates an image sensing time and requests the control apparatus to obtain image data at the image sensing time and to store the image data to be obtained in a memory, and notify the external device of identification information identifying the image data to be obtained based on the reservation command, the reservation command of the external device being included in a URL indicating a location of the obtained image data;

a controller adapted to determine whether or not a current time is the image sensing time designated by the reservation command received from an external device, and control the image sensing device to sense an image in a case that the current time is the image sensing time; and an obtain device adapted to obtain image data, at the image sensing time, sensed by the image sensing device controlled by said controller, and store the obtained image data in the memory; and wherein the communication device outputs the stored image data corresponding to identification information to the external device, in response to receiving the identification information from the external device.

2. A method for dealing with a request of an external device for obtaining image data sensed by an image sensing device via a network, comprising the steps of:

receiving, from an external device, a reservation command which designates image sensing time and requests the control apparatus to obtain image data at the image sensing time and to store the image data to be obtained in a memory;

notifying the external device of identification information identifying the image data to be obtained based on the reservation command, the reservation command of the external device being included in a URL indicating a location of the obtained image data;

determining whether or not a current time is the image sensing time designated by the reservation command received from the external apparatus;

controlling the image sensing device to sense an image in a case that it is determined that the current time is the image sensing time;

obtaining image data, at the image sensing time, sensed by the image sensing device, and storing the obtained image data in the memory; and outputting the stored image data corresponding to identification information to the external device, in response to receiving the identification information from the external device.

* * * * *

UNITED STATES PATENT AND TRADEMARK OFFICE
CERTIFICATE OF CORRECTION

| | | |
|---|---|---|
| PATENT NO. | : 7,298,399 B2 | Page 1 of 1 |
| APPLICATION NO. | : 10/260289 | |
| DATED | : November 20, 2007 | |
| INVENTOR(S) | : Sato et al. | |

It is certified that error appears in the above-identified patent and that said Letters Patent is hereby corrected as shown below:

On the Title Page item 57, replace the ABSTRACT with the following Abstract:

--A camera control apparatus provides an end user with environment to easily remote-control a video camera via a general network such as the Internet. When the camera control apparatus receives a file-transfer request described in the format of the network from an external device connected to the apparatus, it handles the characters in a character string of a file name of the request as a camera-control characters. As a result, if the character string includes a description corresponding to the format for camera control, the camera control apparatus controls the camera in accordance with the description to perform image sensing, and transfers the obtained video image as the content of an image file requested by the external device as the file-transfer request originator.--;

Column 1, Line 54, change "descried" to --described--; and

Column 8, Line 4, change "provides" to --provide--.

Signed and Sealed this

Twenty-ninth Day of April, 2008

JON W. DUDAS
*Director of the United States Patent and Trademark Office*